United States Patent
Nagase et al.

(10) Patent No.: US 10,928,813 B2
(45) Date of Patent: Feb. 23, 2021

(54) PRESSURE-TYPE FLOW RATE CONTROL DEVICE AND FLOW RATE SELF-DIAGNOSIS METHOD USING CRITICAL EXPANSION CONDITION

(71) Applicant: FUJIKIN INCORPORATED, Osaka (JP)

(72) Inventors: Masaaki Nagase, Osaka (JP); Kaoru Hirata, Osaka (JP); Yohei Sawada, Osaka (JP); Katsuyuki Sugita, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 77 days.

(21) Appl. No.: 16/088,333

(22) PCT Filed: Mar. 23, 2017

(86) PCT No.: PCT/JP2017/011851
§ 371 (c)(1),
(2) Date: Sep. 25, 2018

(87) PCT Pub. No.: WO2017/170174
PCT Pub. Date: Oct. 5, 2017

(65) Prior Publication Data
US 2019/0094847 A1    Mar. 28, 2019

(30) Foreign Application Priority Data
Mar. 29, 2016 (JP) ............................. JP2016-065566

(51) Int. Cl.
*G05B 23/02* (2006.01)
*G05D 7/06* (2006.01)

(52) U.S. Cl.
CPC ..... *G05B 23/0264* (2013.01); *G05B 23/0291* (2013.01); *G05D 7/06* (2013.01); *G05D 7/0635* (2013.01)

(58) Field of Classification Search
CPC ............ G05B 23/0264; G05B 23/0291; G05D 7/0635
See application file for complete search history.

(56) References Cited

U.S. PATENT DOCUMENTS 5,669,408 A * 9/1997 Nishino ............... G05D 7/0635
137/487.5
6,302,130 B1 * 10/2001 Ohmi ................... G05D 7/0635
137/14

(Continued)

FOREIGN PATENT DOCUMENTS

CN 101258456 A 9/2008
JP 2000-137528 A 5/2000

(Continued)

OTHER PUBLICATIONS

International Search Report issued in PCT/JP2017/011851; dated Jun. 6, 2017.

*Primary Examiner* — Bernard G Lindsay
(74) *Attorney, Agent, or Firm* — Studebaker & Brackett PC

(57) ABSTRACT

A pressure-type flow rate control device includes a restriction part, a control valve disposed upstream of the restriction part, an upstream pressure sensor, a downstream pressure sensor, and a controller that diagnoses flow rate control by using pressure drop data on a flow passage between the control valve and the restriction part and reference pressure drop data, wherein a close command is issued to the control valve and a shutoff valve provided downstream of the downstream pressure sensor, and the controller determines whether a predetermined critical expansion condition is (Continued)

satisfied by using outputs of the upstream pressure sensor and the downstream pressure sensor after the control valve is closed, and diagnoses flow rate control by using the pressure drop data acquired during a period in which the predetermined critical expansion condition is satisfied.

18 Claims, 9 Drawing Sheets

(56) References Cited

U.S. PATENT DOCUMENTS

| | | | |
|---|---|---|---|
| 6,450,200 B1* | 9/2002 | Ollivier | G05D 7/0647 137/486 |
| 2002/0092564 A1* | 7/2002 | Ollivier | G05D 16/0661 137/487.5 |
| 2009/0112491 A1* | 4/2009 | Nakada | G01F 25/0038 702/47 |
| 2009/0326719 A1 | 12/2009 | Nagase et al. | |
| 2011/0108138 A1 | 5/2011 | Sugita et al. | |
| 2014/0230911 A1* | 8/2014 | Hirata | G01F 25/0007 137/10 |

FOREIGN PATENT DOCUMENTS

| | | |
|---|---|---|
| JP | 2004-138425 A | 5/2004 |
| JP | 3890138 B2 | 3/2007 |
| JP | 4308356 B2 | 8/2009 |
| JP | 2009-265988 A | 11/2009 |
| WO | 2000/011531 A1 | 3/2000 |

\* cited by examiner (a)

(b)

(a)

(b)

(c)

PRESSURE-TYPE FLOW RATE CONTROL DEVICE AND FLOW RATE SELF-DIAGNOSIS METHOD USING CRITICAL EXPANSION CONDITION

TECHNICAL FIELD

The present invention relates to a pressure-type flow rate control device used for, for example, semiconductor manufacturing facilities and chemical plants, and in particular to a pressure-type flow rate control device having a flow rate self-diagnostic function and to a flow rate self-diagnosis method.

BACKGROUND ART

A pressure-type flow rate control device 8 that, as illustrated in FIG. 1, includes a flow passage 1 that allows a fluid G that is to be controlled to pass through, a restriction part 2 such as an orifice plate that is interposed in the flow passage 1, an upstream pressure sensor 3 that detects an upstream pressure $P_1$ of the restriction part 2, a downstream pressure sensor 4 that detects a downstream pressure $P_2$ of the restriction part 2, a temperature sensor 5 that detects an upstream temperature T of the restriction part 2, a control valve 6 that is provided upstream of the upstream pressure sensor 3 in the flow passage 1, and a controller 7 that controls the control valve 6 has conventionally been known (e.g., PTL 1). The pressure-type flow rate control device 8 is connected on the downstream side to a shutoff valve 9, a process chamber 10, and a vacuum pump 11.

This type of pressure-type flow rate control device performs control such that the controller 7 controls the control valve 6 so as to adjust the flow rate to a predetermined flow rate based on the upstream pressure ($P_1$) detected by the upstream pressure sensor 3 or with both of the upstream pressure ($P_1$) and the downstream pressure ($P_2$) detected by the downstream pressure sensor 4 by making use of the fact that a predetermined relationship is established among the upstream pressure ($P_1$), the downstream pressure ($P_2$), and a flow rate Q of gas passing through the restriction part 2. For example, the relationship given by the equation for the flow rate, $Q=K_1 P_1$, where $K_1$ is constant, is established under a critical expansion condition, i.e., under a condition satisfying $P_1 \geq$ approx. $2 \times P_2$. The constant K is constant as long as the aperture diameter of the restriction part 2 is the same. Also, the relationship given by the equation for the flow rate, $Q=KP_2^m(P_1-P_2)^n$, where K is the factor of proportionality depending on the fluid type and temperature and the indices m and n are values derived from the actual flow rate, is established under a non-critical expansion condition. The flow rate can be acquired by computation using these calculation equations for the flow rate.

However, the flow rate changes when problems such as corrosion or clogging occur in the restriction part 2 of the pressure-type flow rate control device 8 due to long-time use or other reasons, and the flow rate can no longer be controlled with high accuracy.

Thus, flow rate self-diagnosis has conventionally been proposed, in which the presence or absence of a change in flow rate caused by changes in the aperture diameter of the restriction part 2 is diagnosed (e.g., PTLs 2 and 3).

This flow rate self-diagnosis uses a pressure drop characteristic whereby the pressure between the control valve 6 and the restriction part 2 drops gradually when the control valve 6 is closed. Since the aforementioned pressure drop characteristic changes with changes in the aperture diameter of the restriction part 2, the presence or absence of a change in the aperture diameter of the restriction part 2 and hence a change in flow rate can be diagnosed by comparing the initial pressure drop characteristic and the pressure drop characteristic at the time of diagnosis.

More specifically, the aforementioned flow rate self-diagnosis includes a first step of keeping a set flow rate $Q_S$ at a high set flow rate $Q_{SH}$, a second step of switching this high set flow rate $Q_{SH}$ to and keeping a low set flow rate $Q_S$ and measuring the upstream pressure $P_1$ to acquire pressure drop data P(t), a third step of comparing the pressure drop data P(t) with reference pressure drop data Y(t) measured at the initial stage during which there is no clogging in the restriction part 2 under the same conditions, and a fourth step of notifying the occurrence of clogging when the pressure drop data P(t) after the elapse of a predetermined period of time from the switching to the low set flow rate $Q_{SL}$ deviates by a predetermined degree or more from the reference pressure drop data Y(t).

Ordinarily, the reference pressure drop data Y(t) is acquired by passing a nitrogen gas at a 100 percent flow rate (full-scale flow rate) for a fixed period of time with the downstream side evacuated, and after the flow rate has stabilized, closing the control valve 6 and measuring the pressure drop characteristic. Thus, in the flow rate self-diagnosis, the pressure drop data P(t) is generally measured under the same conditions as in the case of acquiring the reference pressure drop data, i.e., under conditions that the high set flow rate $Q_{SH}$ is set to a 100 percent flow rate (full-scale flow rate) and that the low set flow rate $Q_{SL}$ is set to a 0 percent flow rate (i.e., the control valve 6 is fully closed).

Since the pressure drop characteristic varies according to the aperture diameter of the restriction part 2 and the internal volume of the flow passage 1 from the control valve 6 to the restriction part 2, the number of samplings and the measurement time, required to acquire the pressure drop data P(t), are stored in advance in a memory M of the controller 7 in association with the aperture diameter of the restriction part 2 and the aforementioned internal volume. The number of samplings is set to a number that can ensure the desired self-diagnostic accuracy and may be set to 50, for example. The measurement time is set to a period of time from the start of measurement at a 100 percent flow rate to a time far enough in advance of the time of transition to the non-critical expansion condition, in order to ensure that the measurement is conducted within a period of time in which the critical expansion condition ($P_1 \geq$ approx. $2 \times P_2$) is satisfied. The time at which the critical expansion condition changes to the non-critical expansion condition is obtained by conducting tests in advance.

CITATION LIST

Patent Literatures

PTL 1: Japanese Patent Application Laid-Open No. 2004-138425
PTL 2: Japanese Patent Application Laid-Open No. 2000-137528
PTL 3: Japanese Patent Application Laid-Open No. 2009-265988
PTL 4: Japanese Patent No. 3890138
PTL 5: Japanese Patent No. 4308356

SUMMARY OF INVENTION

Technical Problem

The use of the pressure drop data at the time when the critical expansion condition is satisfied as the pressure drop data P(t) for flow rate self-diagnosis is known (e.g., PTL 4). However, conventional pressure-type flow rate control devices cannot determine whether the critical expansion condition is actually satisfied because only the upstream pressure is observed during flow rate self-diagnosis. Thus, the measurement time is set such that the measurement of the pressure drop data for flow rate self-diagnosis is completed at a time far enough in advance of the time at which the upstream pressure gradually attenuates from the critical expansion condition to the non-critical expansion condition. As a result, the period of time available for the measurement of the pressure drop data P(t) is restricted, and in some cases, it is difficult to secure a wide measurement time range.

Also, particularly in a gas supply device that includes a plurality of pressure-type flow rate control devices connected in parallel, flow rate self-diagnosis has to be carried out after switching to a maintenance mode when the supply of gas to all the pressure-type flow rate control devices has been stopped after process termination, in order to ensure that the measurement is conducted under the critical expansion condition, resulting in loss of time due to the maintenance mode.

PTL 5 discloses a method in which flow rate self-diagnosis is carried out by measuring the pressure drop characteristic either for a short period of time during a process or at the end of a process (e.g., FIGS. 6 and 7 in PTL 5). However, the method disclosed in PTL 5 requires the shutoff valve on the process chamber side to be kept open during self-diagnosis. Accordingly, there is a problem in that, even after the upstream control valve is closed, residual gas continues to be supplied to the process chamber via the shutoff valve until the diagnostic process ends. Also, in the case where a plurality of pressure-type flow rate control devices are connected as described above, if the shutoff valve on the process chamber side is open, the downstream pressure increases because gas flowing through other lines is supplied to the chamber, which may result in the self-diagnosis being carried out in a state in which the critical expansion condition is not satisfied.

Moreover, the inventors of the present invention found that if self-diagnosis is carried out by measuring the pressure drop characteristic from after process termination as described above, self-diagnostic accuracy may deteriorate because the upstream pressure (initial pressure) at the process termination can take various values.

In view of this, it is a primary object of the present invention to provide a pressure-type flow rate control device having a flow rate self-diagnostic function and a flow rate self-diagnosis method for the pressure-type flow rate control device, with which it is possible to secure the maximum possible amount of time to acquire the pressure drop data effective for flow rate self-diagnosis and to carry out flow rate self-diagnosis at the time when the supply of gas is stopped following, for example, process termination without switching to the maintenance mode.

Solution to Problem

A pressure-type flow rate control device according to an embodiment of the present invention includes a restriction part, a control valve provided upstream of the restriction part, an upstream pressure sensor that detects a pressure of a flow passage between the restriction part and the control valve, a downstream pressure sensor that detects a pressure of a flow passage downstream of the restriction part, with a shutoff valve being provided downstream of the downstream pressure sensor, and a controller having a flow rate self-diagnostic function of diagnosing flow rate control using pressure drop data on the flow passage between the control valve and the restriction part and reference pressure drop data. In a case of executing the flow rate self-diagnostic function, a close command is issued to the control valve and the shutoff valve, and the controller closes the control valve, determines whether a predetermined critical expansion condition is satisfied by using outputs of the upstream pressure sensor and the downstream pressure sensor that are measured after the control valve is closed, and diagnoses flow rate control by using the pressure drop data acquired during a period in which the predetermined critical expansion condition is satisfied.

In one embodiment, in a case where the close command is issued, the shutoff valve is closed after a predetermined amount of time has elapsed from when the control valve is closed, and the pressure drop data acquired during the period in which the predetermined critical expansion condition is satisfied includes pressure drop data that is acquired from when the close command is issued to the shutoff valve to before when the shutoff valve is closed, and pressure drop data that is acquired after the shutoff valve is closed and a downstream pressure has risen.

In one embodiment, the control valve is a piezoelectric element-driven control valve, the shutoff valve is a fluid operated valve, and the close command is issued simultaneously to the control valve and the shutoff valve.

In one embodiment, the pressure drop data is acquired by sampling the output from the upstream pressure sensor at a preset sampling frequency, and the flow rate control is diagnosed based on comparison between a coefficient of a predetermined function acquired from a plurality of pieces of the pressure drop data and a reference coefficient stored in advance as the reference pressure drop data.

In one embodiment, the pressure drop data is acquired by sampling the output from the upstream pressure sensor at a preset sampling frequency, and a form of comparison with the reference pressure drop data is determined based on the number of samples obtained during the period in which the predetermined critical expansion condition is satisfied.

In one embodiment, the pressure drop data is acquired by sampling the output from the upstream pressure sensor at a preset sampling frequency, and the preset sampling frequency is updated based on the number of samples obtained during the period in which the predetermined critical expansion condition is satisfied.

In one embodiment, the pressure-type flow rate control device further includes a temperature sensor that detects a temperature between the restriction part and the control valve. The controller controls the control valve on a basis of the outputs from the upstream pressure sensor, the downstream pressure sensor, and the temperature sensor to achieve a set for rate for a flow rate passing through the restriction part.

In one embodiment, the predetermined critical expansion condition is determined based on at least one of a type of gas that flows through the restriction part and the temperature that is output from the temperature sensor.

In one embodiment, the controller performs the comparison with the reference pressure drop data after correcting the pressure drop data on a basis of a flow rate or an upstream pressure at a time when the control valve is closed.

A flow rate self-diagnosis method according to an embodiment of the present invention is performed in a pressure-type flow rate control device that includes a restriction part, a control valve provided upstream of the restriction part, an upstream pressure sensor that detects a pressure of a flow passage between the restriction part and the control valve, a downstream pressure sensor that detects a pressure of a flow passage downstream of the restriction part, with a shutoff valve being provided downstream of the downstream pressure sensor, and a controller having a flow rate self-diagnostic function of diagnosing flow control by using pressure drop data on the flow passage between the control valve and the restriction part and reference pressure drop data stored in advance. The flow rate self-diagnosis method includes the steps of issuing a close command to the control valve and the shutoff valve when a flow rate of gas flowing is controlled at a set flow rate, after the close command is issued, determining whether a critical expansion condition is satisfied based on outputs of the upstream pressure sensor and the downstream pressure sensor, if the critical expansion condition is satisfied, storing pressure drop data measured during a period in which the critical expansion condition is satisfied, and carrying out self-diagnosis of flow rate control by comparing pressure drop data acquired during the period in which the critical expansion condition is satisfied with the reference pressure drop data.

In one embodiment, when the close command is issued, the shutoff valve is closed after a predetermined period of time has elapsed from when the control valve is closed, and at least one piece of pressure drop data acquired from when the close command is issued to before when the shutoff valve is closed and at least one piece of pressure drop data acquired after the shutoff valve is closed are used as pressure drop data acquired during the period in which the critical expansion condition is satisfied.

In one embodiment, the step of issuing the close command is executed when gas supply is stopped at the end of a process of semiconductor manufacturing equipment connected to the pressure-type flow rate control device.

In one embodiment, the step of carrying out self-diagnosis of flow rate control includes a step of comparing a coefficient of a predetermined function obtained from the pressure drop data and a reference coefficient stored in advance as the reference pressure drop data.

In one embodiment, the flow rate self-diagnosis method further includes the step of determining the critical expansion condition on a basis of at least one of a type of gas flowing through the restriction part and a temperature of the gas.

A pressure-type flow rate control device according to an embodiment of the present invention includes a restriction part, a control valve provided upstream of the restriction part, an upstream pressure sensor that detects a pressure of a flow passage between the restriction part and the control valve, and a controller having a flow rate self-diagnostic function of diagnosing flow rate control by using pressure drop data on the flow passage between the control valve and the restriction part and reference pressure drop data. In a case where the flow rate self-diagnostic function is executed, the controller acquires the pressure drop data by measuring a drop in upstream pressure with the upstream pressure sensor after the control valve is closed, and uses, as the reference pressure drop data, reference pressure drop data that is based on either an initial upstream pressure that is an upstream pressure at a time when the control valve is closed or an initial flow rate that is a flow rate determined using the initial upstream pressure.

In one embodiment, the reference pressure drop data is a slope $\alpha$ of a straight line defined by $\ln(P(t)/P_0)=-\alpha t$, where $P(t)$ is a function of pressure with respect to time, $P_0$ is an initial pressure, and $t$ is time.

In one embodiment, the controller has the slope $\alpha$ of the straight line defined by $\ln(P(t)/P_0)=-\alpha t$ as a function of the initial pressure $P_0$.

In one embodiment, the pressure-type flow rate control device further includes a downstream pressure sensor that detects a pressure of a flow passage downstream of the restriction part. Whether a predetermined critical expansion condition is satisfied is determined using the upstream pressure sensor and the downstream pressure sensor, and the flow rate control is diagnosed using the pressure drop data acquired during the period in which the predetermined critical expansion condition is satisfied.

In one embodiment, whether the predetermined critical expansion condition is satisfied is determined after the pressure drop data has been acquired.

A flow rate self-diagnosis method according to an embodiment of the present invention is performed in a pressure-type flow rate control device that includes a restriction part, a control valve provided upstream of the restriction part, an upstream pressure sensor that detects a pressure of a flow passage between the restriction part and the control valve, and a controller having a flow rate self-diagnostic function of diagnosing flow rate control by using pressure drop data on the flow passage between the control valve and the restriction part and reference pressure drop data. The flow rate self-diagnosis method includes the steps of acquiring the pressure drop data by measuring a drop in upstream pressure with the upstream pressure sensor after the control valve is closed, and diagnosing flow rate control by comparing the pressure drop data and the reference pressure drop data. A slope $\alpha$ of a straight line defined by $\ln(P(t)/P_0)=-\alpha t$, where $P(t)$ is a function of a pressure with respect to time, $P_0$ is an initial pressure, and $t$ is time, is used as the pressure drop data and the reference pressure drop data.

Advantageous Effects of Invention

According to embodiments of the present invention, it is possible to carry out flow rate self-diagnosis while monitoring whether the critical expansion condition is satisfied, thus enabling the maximum possible amount of time to acquire the pressure drop data for flow rate self-diagnosis to be secured, and also to carry out flow rate self-diagnosis using the pressure drop characteristic measured from the pressure at the time when the supply of gas is stopped without switching to the maintenance mode.

Also, according to the other embodiments of the present invention, even if the upstream pressure takes any arbitrary value at the end of, for example, a semiconductor manufacturing process or step, it is possible to appropriately carry out flow rate self-diagnosis using the pressure drop data.

DESCRIPTION OF EMBODIMENTS

Figure 1:
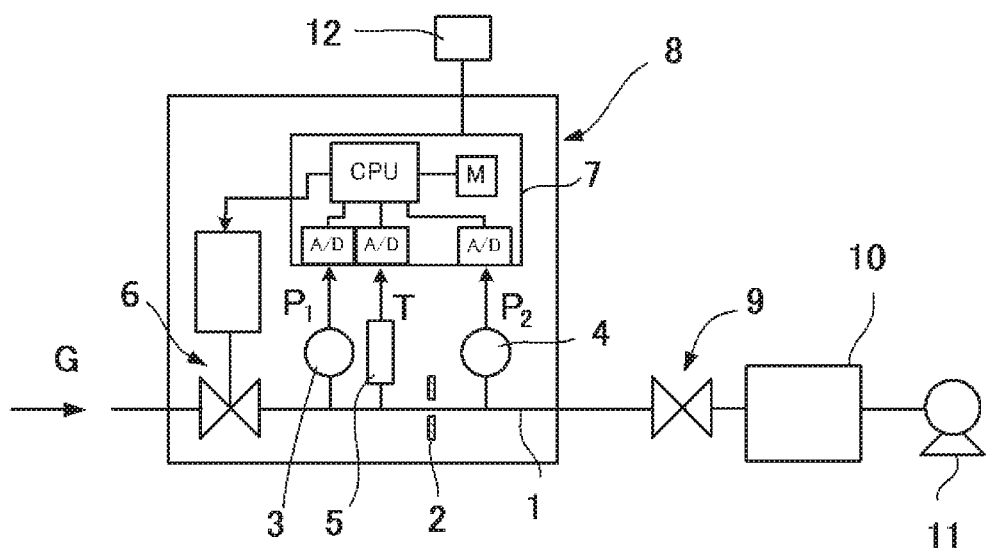
FIG. 1 is a block diagram of a pressure-type flow rate control device related to the present invention.
Figure 2:
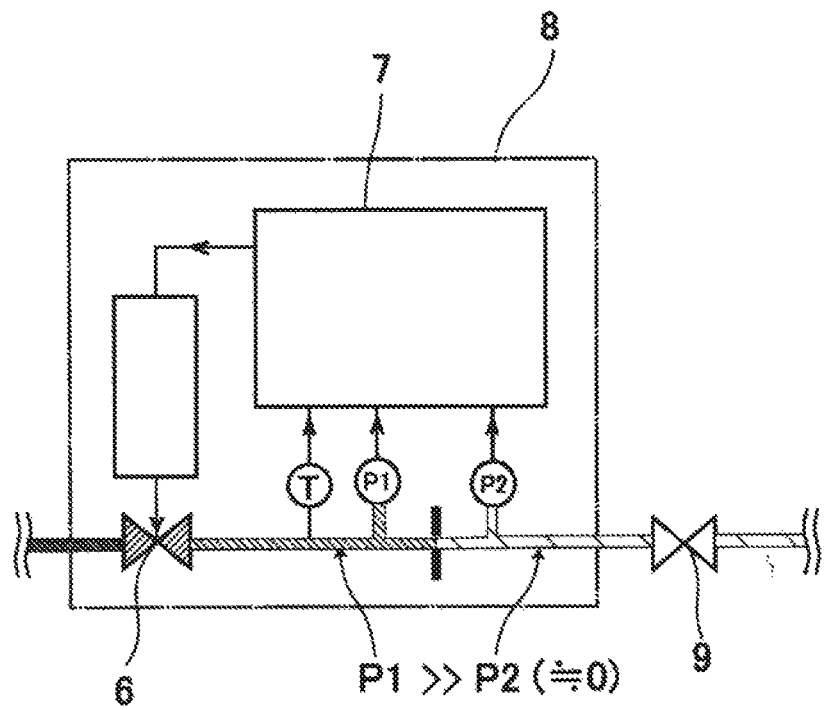
FIG. 2(*a*) is a schematic diagram illustrating a state in which gas is supplied during a process, and FIG. 2(*b*) is a schematic diagram illustrating a state in which gas is shutoff after a process.
Figure 2:
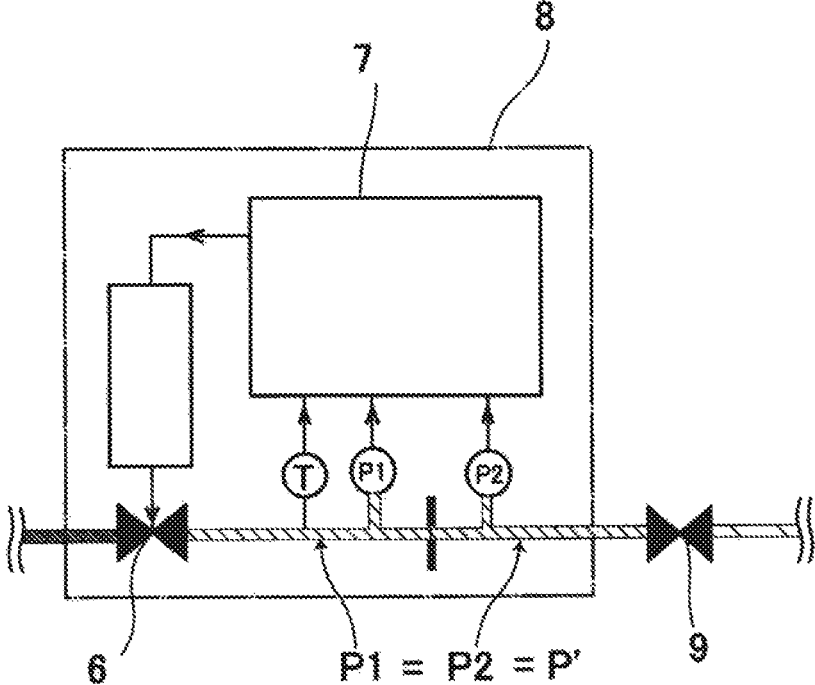

One embodiment of a pressure-type flow rate control device according to the present invention will be described hereinafter with reference to FIGS. 1 to 15. Note that constituent elements that are identical or similar, including those in conventional techniques, are given the same reference numerals.

A pressure-type flow rate control device 8 has, for example, a configuration as illustrated in FIG. 1 and includes a restriction part 2 interposed in a flow passage 1, a control valve 6 interposed upstream of the restriction part 2 in the flow passage 1, an upstream pressure sensor 3 that is disposed between the restriction part 2 and the control valve 6 and detects an upstream pressure $P_1$ of the restriction part 2, a downstream pressure sensor 4 that detects a downstream pressure $P_2$ of the restriction part 2, a temperature sensor 5 that detects a temperature between the restriction part 2 and the control valve 6, and a controller 7. Unlike in the conventional pressure-type flow rate control devices, the controller 7 is configured to be capable of executing a self-diagnostic function at the time when semiconductor manufacturing equipment ends its process (when the supply of gas to a process chamber is stopped).

The control valve 6 of the pressure-type flow rate control device 8 is connected on the upstream side to a gas supply source, and the downstream pressure sensor 4 is connected on the downstream side to a process chamber 10 of semiconductor manufacturing equipment via a shutoff valve 9. The process chamber 10 is connected to a vacuum pump 11, and when gas is supplied, the interior of the process chamber 10 is evacuated by the vacuum pump 11.

In the mode illustrated in FIG. 1, the shutoff valve 9 is disposed outside the pressure-type flow rate control device 8, but the shutoff valve 9 may be built into the flow rate control device 8. In the present embodiment, the operations of opening and closing the shutoff valve 9 are controlled by an external control device (not shown) connected to the controller 7, but the operations may be controlled by the controller 7 in other modes.

The flow passage 1 in the pressure-type flow rate control device 8 may, for example, be a hole formed in a metal block. The upstream pressure sensor 3 and the downstream pressure sensor 4 may include, for example, a sensor chip and a diaphragm, made of monocrystalline silicon. The control valve 6 may, for example, be a piezoelectric element-driven control valve that opens and closes a metal diaphragm valve using a piezoelectric element (piezoelectric actuator).

In the pressure-type flow rate control device 8, the controller 7 controls the control valve 6 so as to set the flow rate of gas passing through the restriction part 2 to a set flow rate on the basis of detection outputs from the upstream pressure sensor 3, the downstream pressure sensor 4, and the temperature sensor 5. The controller 7 includes, for example, a CPU, a memory M, and A/D converters (see FIG. 1). The controller 7 may include a computer program configured to execute operations, which will be described later, and can be implemented by a combination of hardware and software.

When gas is supplied to the process chamber 10 in semiconductor manufacturing processes, the controller 7 obtains the flow rate by computation using the output(s) of the upstream pressure sensor 3 (and the downstream pressure sensor 4 and the temperature sensor 5) and controls the control valve 6 so as to set the flow rate of gas passing through the restriction part 2 to a set flow rate. The flow rate obtained by computation may be displayed as a flow rate output value on a display of the external control device.

With the gas flowing at the set flow rate, the control valve 6 is open at an opening degree that matches the set flow rate, and the shutoff valve 9 is set to the open state as illustrated in FIG. 2(a). At this time, the upstream pressure $P_1$ and the downstream pressure $P_2$ are maintained at different constant values. Specifically, the upstream pressure $P_1$ is maintained at a control pressure corresponding to the set flow rate, and the downstream pressure $P_2$ is maintained at a chamber internal pressure (e.g., a vacuum pressure of 200 torr or less, a reduced pressure of approximately 400 torr, or an atmospheric pressure).

Thereafter, when a semiconductor manufacturing process has ended, in the present embodiment, the control valve 6 and the shutoff valve 9 are closed, and the supply of gas to the process chamber 10 is stopped. FIG. 2(b) illustrates a state in which the control valve 6 and the shutoff valve 9 have transitioned from the open state to the closed state. The operation of closing the control valve 6 is implemented by issuing a close command to the control valve 6, and, specifically, can be executed by setting the set flow rate that is input to the pressure-type flow rate control device 8 to zero. The shutoff valve 9 is set to the closed state upon, for example, receipt of a close command from the external control device. After the control valve 6 and the shutoff valve 9 are closed in this way, the upstream pressure $P_1$ and the downstream pressure $P_2$ converge to the same equilibrium pressure P'.

The pressure-type flow rate control device 8 according to the present embodiment is configured to carry out self-diagnosis during this process in which the control valve 6 and the shutoff valve 9 transition to the closed state and the supply of gas is stopped. In the pressure-type flow rate control device 8, since the shutoff valve 9 is closed during self-diagnosis, it is possible to prevent excess gas (e.g., gas remaining between the control valve 6 and the restriction part 2) from continuing to be supplied to the process chamber 10 after process termination. Also, the closing of the shutoff valve 9 prevents the downstream pressure from being affected by the supply of gas from other lines and also prevents backflow of gas to the pressure-type flow rate control device 8. Accordingly, the self-diagnosis according to the present embodiment can be carried out in any arbitrary gas supply line at normal process termination, without affecting existing semiconductor manufacturing processes.

Figure 3:
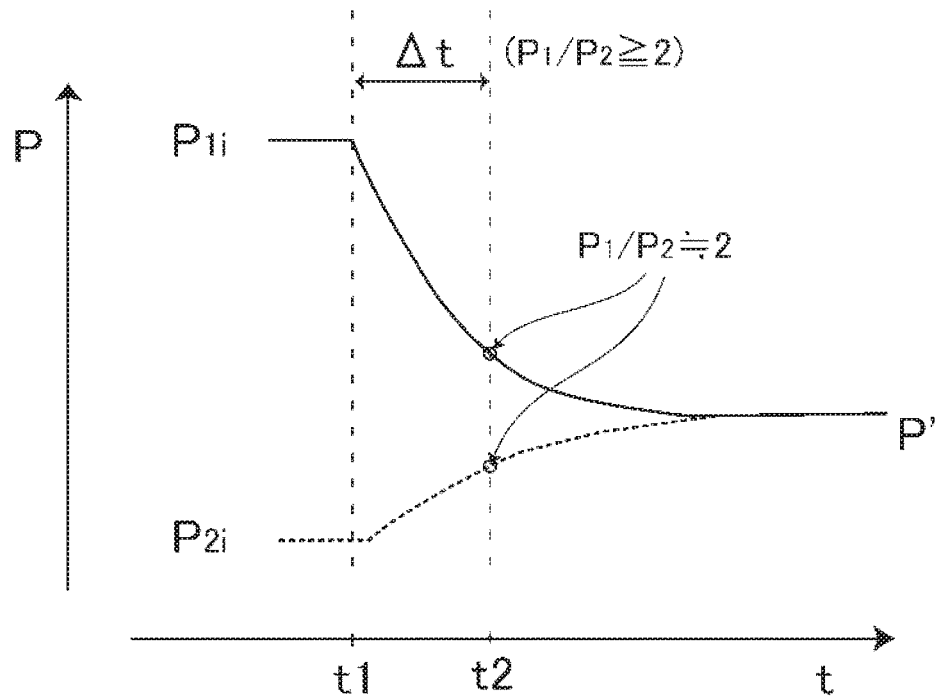
FIG. 3 is a graph showing changes in upstream pressure $P_1$ and downstream pressure $P_2$ when the operation of closing a valve is performed in the gas supply state.

FIG. 3 is a graph showing changes in the upstream pressure $P_1$ and the downstream pressure $P_2$ when the control valve 6 and the shutoff valve 9 are closed. As illustrated in FIG. 3, when the control valve 6 and the shutoff valve 9 have received a close command at time t1 and are maintained in the closed state from then on, the upstream pressure $P_1$ drops from an initial pressure $P_{1i}$ in the state of gas flow, and the downstream pressure $P_2$ rises from an initial pressure $P_{2i}$ in the state of gas flow. That is, pressure variations occur between the upstream and downstream sides of the restriction part 2 so as to eliminate a pressure difference. Then, the upstream pressure $P_1$ and the downstream pressure $P_2$ converge to substantially the same equilibrium pressure value P' over time since the valves 6 and 9 on both sides of the restriction part 2 are maintained in the closed state.

In the above-described pressure variation process for the upstream pressure $P_1$ and the downstream pressure $P_2$, the critical expansion condition will no longer be satisfied at time t2 (hereinafter, also referred to as a critical time). This critical time t2 varies for various reasons. For example, the critical time t2 varies due to the critical expansion condition itself changing depending on the type of gas. For example, in the case of an argon gas, the critical time t2 is a time when the pressure ratio $P_1/P_2$ reaches 2.05, whereas in the case of a nitrogen gas, the critical time t2 is a time when the pressure ratio $P_1/P_2$ reaches 1.89. The critical time t2 also varies according to the initial upstream pressure $P_{1i}$. In the specification of the present invention, a period $\Delta t$ from the time t1 when the upstream pressure $P_1$ starts to drop after the close command is issued to the control valve 6 and the shutoff valve 9 to the critical time t2 is hereinafter also referred to as a critical expansion period $\Delta t$.

The inventors of the present invention found that, in the case of using an air operated valve (AOV) as the shutoff valve 9, the critical time t2 and the critical expansion period $\Delta t$ described above vary significantly according to the design of the AOV. The air operated valve as used herein refers to a wide variety of fluid drive valves that can be opened and closed with a fluid such as air.

Figure 4:
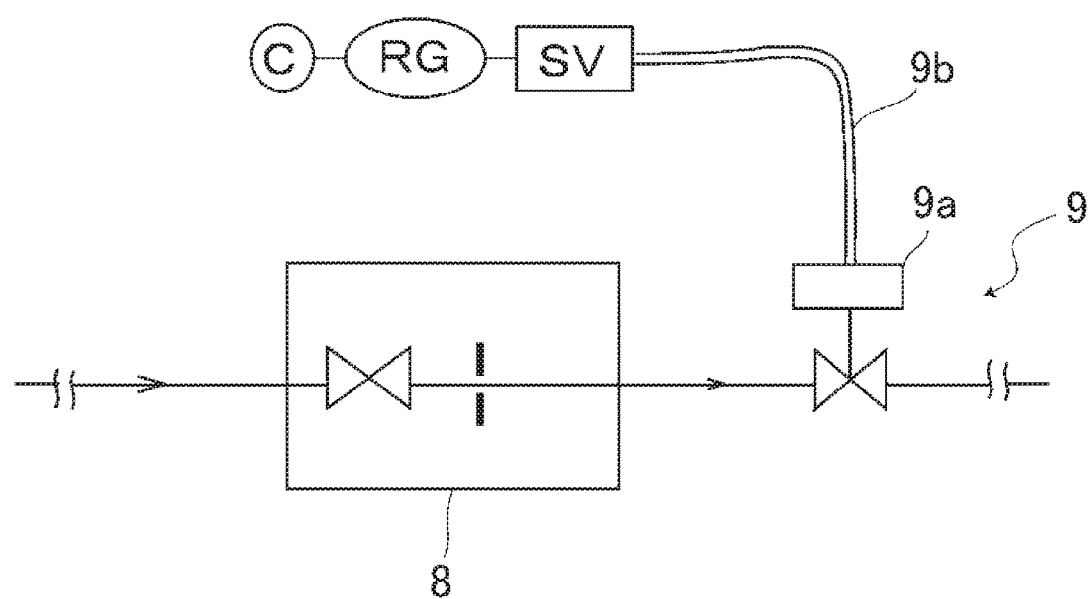
FIG. 4 is a schematic diagram illustrating a configuration in the case of using an air operated valve as a shutoff valve.
Figure 5:
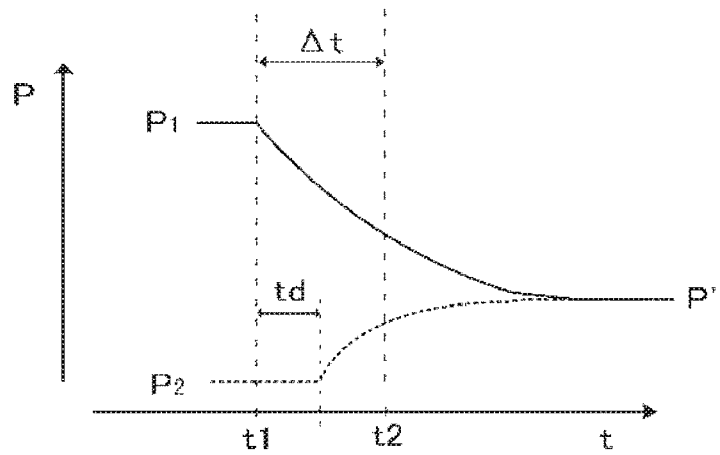
FIGS. 5(a) to 5(c) are graphs showing actual pressure variations for compressed air line tubes of different lengths when a close command is issued simultaneously to a control valve and a shutoff valve.
Figure 5:
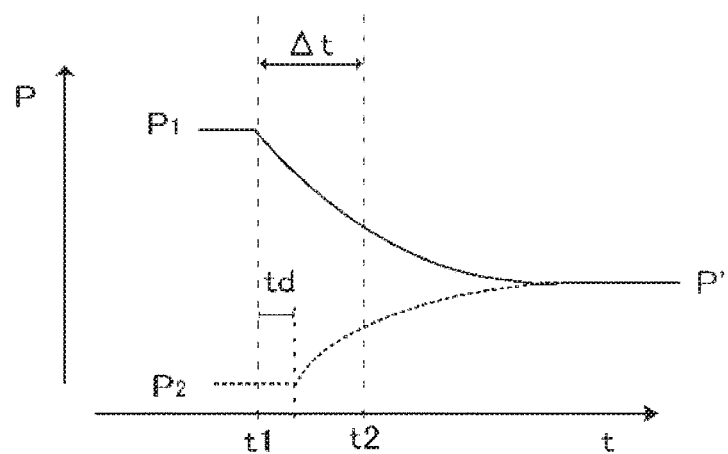
Figure 5:
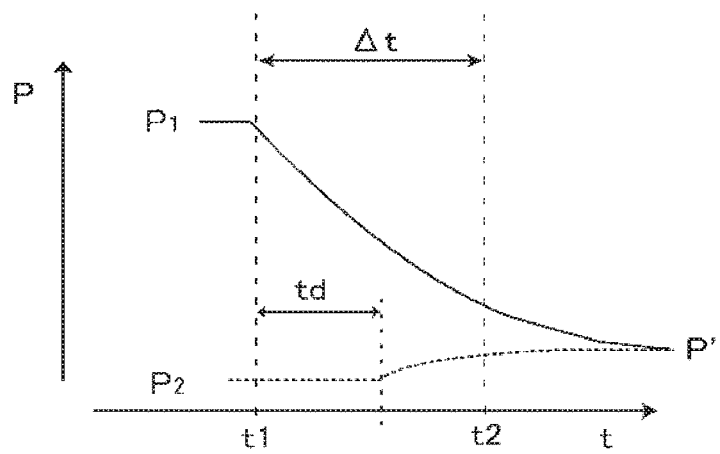

FIG. 4 is a schematic diagram illustrating the shutoff valve 9 configured by an AOV. The shutoff valve 9 includes a valve mechanism 9a including a valve element and a compressed air operating part, and a compressed air line tube 9b connected to the valve mechanism 9a. In the illustrated mode, the compressed air line tube 9b is connected via a solenoid valve SV and a regulator RG to a compressor C serving as an air supply, and the valve can be closed by pumping compressed air from the compressor C into the valve mechanism 9a.

FIGS. 5(a) to 5(c) are graphs showing actual pressure variations when a close command is issued simultaneously to the control valve 6 and the shutoff valve 9 in each case where the compressed air line tube 9b illustrated in FIG. 4 have a different length. FIG. 5(a) illustrates the case where the compressed air line tube 9b has a standard length, FIG. 5(b) illustrates the case where the length of the tube 9b is short, and FIG. 5(c) illustrates the case where the length of the tube 9b is long.

As illustrated in FIG. 5(a), even in the case where the tube 9b has a standard length, the AOV cannot be opened instantaneously due to low responsiveness of the compressed air system. Thus, even if a close command is issued simultaneously to the control valve 6 and the shutoff valve 9, in actuality the shutoff valve 9 is closed with a delay of delay time td after the control valve 6 (typically, piezoelectric element-driven diaphragm valve) is closed, and a rise in the downstream pressure $P_2$ starts from this point in time.

The delay time td becomes shorter when the length of the tube 9b is relatively short as illustrated in FIG. 5(b), whereas the delay time td becomes longer when the length of the tube 9b is relatively long as illustrated in FIG. 5(c). Also, the equilibrium pressure P' is high when the delay time td is short, whereas the equilibrium pressure P' is low when the delay time td is long. Consequently, the period $\Delta t$ during which the critical expansion condition is satisfied varies according to the length of the tube 9b.

Experiments performed by the inventors of the present invention confirmed that the delay time td also varies according to the magnitude of air pressure that operates the AOV. More specifically, the delay time td becomes shorter as the AOV working pressure becomes lower, whereas the delay time td becomes longer as the AOV working pressure becomes higher.

In this way, in the case of using an AOV as the shutoff valve 9, the delay time td varies according to the design of the device, and in response, particularly the variation curve of the downstream pressure $P_2$ becomes completely different. As a result, the critical time t2 and the critical expansion period $\Delta t$ described above can also vary according to the design of the AOV.

The experiments performed by the inventors of the present invention further confirmed that, in the mode in which both of the control valve 6 and the shutoff valve 9 are closed as described above, the critical expansion period $\Delta t$ is relatively long when the initial upstream pressure (i.e., set flow rate) before the valves are closed is high, and the critical expansion period $\Delta t$ becomes shorter as the initial upstream pressure becomes lower. This indicates that there is a possibility that, when the set flow rate after a semiconductor manufacturing process is low (e.g., 40 percent flow rate), it may become difficult to secure a self-diagnostic period, which can easily be secured conventionally using a pressure drop characteristic measured from a 100 percent flow rate. In the case of a 40 percent flow rate, the critical expansion period $\Delta t$ may become, for example, approximately half the critical expansion period $\Delta t$ in the case of a 100 percent flow rate. Also, the inventors of the present invention confirmed that the critical expansion period $\Delta t$ also varies according to the capacity of the pressure-type flow rate control device 8.

For the reasons described above, in embodiments of the present invention, self-diagnosis is carried out while checking whether the critical expansion condition is actually satisfied by referencing the upstream pressure $P_1$ and the downstream pressure $P_2$. This makes it possible to secure the maximum possible amount of time to acquire the upstream pressure drop data effective for diagnosis, irrespective of the design of the fluid supply control system and the content of the semiconductor manufacturing process. This self-diagnosis can be carried out easily and speedily when the supply of gas is stopped at the end of an arbitrary process in semiconductor manufacture, without interrupting conventional semiconductor manufacturing processes. Also, diagnostic accuracy can be improved since it is possible to secure the maximum possible amount of time to acquire the pressure drop data for flow rate self-diagnosis.

FIG. 13(a) illustrates a self-diagnostic process according to a comparative example, and FIG. 13(b) illustrates a self-diagnostic process according to a working example of the present invention. In FIGS. 13(a) and 13(b), the upper section illustrates a command to open and close the control valve (flow rate control command), the middle section illustrates a command to open and close the shutoff valve, and the lower section illustrates a change in upstream pressure. The horizontal axis in each graph indicates time t, and in both cases, the self-diagnostic process is performed after the end of a semiconductor process performed with the flow rate set to x percent.

In the comparative example illustrated in FIG. 13(a), after the semiconductor process with the flow rate set to x percent ends, the supply of gas is stopped by closing the control valve and the shutoff valve, and thereafter self-diagnosis is carried out in a maintenance mode that is separately provided. In the maintenance mode, the control valve 6 is opened 100 percent to pass gas in a state in which the shutoff valve 9 is opened and evacuated, and thereafter only the control valve 6 is closed so as to cause a drop in upstream pressure. Self-diagnosis is carried out within the critical expansion period Δt on the basis of pressure drop data measured at this time period.

In the example illustrated in FIG. 13(b), on the other hand, after the semiconductor process with the flow rate set to x percent ends, the control valve and the shutoff valve are closed to stop the supply of gas, and self-diagnosis is carried out using upstream pressure drop data measured from the flow rate set to x percent (arbitrary initial flow rate). Accordingly, the procedure for self-diagnosis can be shortened significantly as compared to the case of the comparative example, and self-diagnosis can easily be executed after the end of an arbitrary semiconductor process.

In the conventional diagnosis method that is performed with the shutoff valve 9 left open, there is almost no need to consider variations in the downstream pressure $P_2$. Thus, it is relatively easy to, for example, estimate a range that satisfies the critical expansion condition from the upstream pressure $P_1$ and set the self-diagnostic period in advance within this range. Also, in the case where the downstream pressure $P_2$ is maintained at a vacuum pressure, it is not that difficult to secure a sufficient self-diagnostic period depending on the initial setting because the critical expansion period Δt becomes longer.

However, in the case where the downstream pressure $P_2$ can fluctuate variously in response to the operation of closing the shutoff valve 9 as described above, the accuracy of diagnostic results can be increased by carrying out self-diagnosis while determining whether the critical expansion condition is actually satisfied.

Also, in the case where a solenoid valve is used, instead of an AOV, as the shutoff valve 9, the delay time td becomes almost zero and the rise of the downstream pressure $P_2$ is brought forward. In this case, the critical expansion period Δt also becomes shorter than in conventional cases, and therefore it is effective to carry out self-diagnosis while determining whether the critical expansion condition is actually satisfied.

Hereinafter, a specific example of the flow of self-diagnosis will be described.

The controller 7 of the pressure-type flow rate control device 8 according to the present embodiment has a flow rate self-diagnostic function of, after the control valve 6 is closed, confirming from the measured upstream pressure $P_1$ and the measured downstream pressure $P_2$ whether the critical expansion condition is satisfied and diagnosing the flow rate by comparison of the pressure drop data P(t) of the upstream pressure $P_1$ between the control valve 6 and the restriction part 2 with the reference pressure drop data Y(t) stored in advance.

The reference pressure drop data Y(t) is, for example, pressure drop data measured when the set flow rate is switched from a 100 percent set flow rate to a 0 percent set flow rate. The reference pressure drop data Y(t) is generally measured in advance before factory shipment and stored in the memory M of the controller 7.

The reference pressure drop data Y(t) may be prepared for each different set flow rate, e.g., an 80 percent flow rate, a 60 percent flow rate, and a 40 percent flow rate, in order to support arbitrary flow rates, and the plurality of pieces of reference pressure drop data Y(t) may be stored in the memory M. The present invention is, however, not limited to this, and measured pressure drop data P(t) may be corrected in accordance with a set flow rate and then compared with reference pressure drop data Y(t) for a 100 percent set flow rate read from the memory M. Also, while the reference pressure drop data Y(t) as used herein is pressure drop data measured in advance under normal conditions before factory shipment, the reference pressure drop data Y(t) may be data measured under abnormal conditions, data measured at the previous time, or set data that does not depend on measurement.

Figure 6:
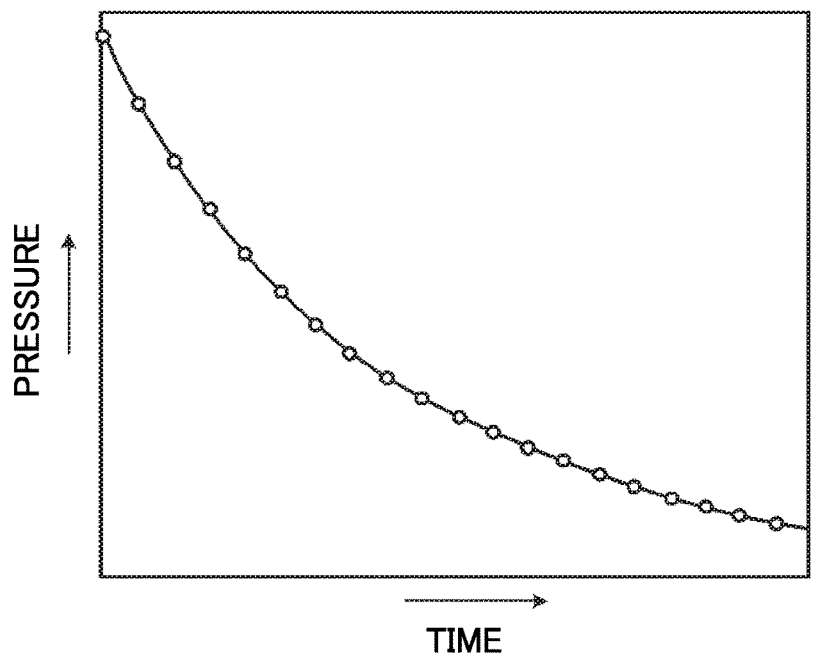
FIG. 6 is a graph showing reference pressure drop data Y(t).

FIG. 6 illustrates an example of the reference pressure drop data Y(t). The pressure drop characteristic generally attenuates exponentially. In FIG. 6, the number of samples of the detected pressure from the upstream pressure sensor 3 is 20, and sampling points are indicated by open circles.

The reference pressure drop data Y(t) is expressed logarithmically by Equation (3) below using the relationships given by Equations (1) and (2) below.

$$\ln \frac{P_t}{P_0} = -\frac{SC_t \sqrt{R_t \cdot T_t}}{V} t_n \qquad (1)$$

In Equation (1), $P_0$ is the upstream pressure when the control valve 6 is closed, $P_t$ is the upstream pressure after the elapse of time (t), S is the cross-sectional area of the aperture of the restriction part 2, $C_t$ is the specific-heat ratio of the gas at time (t), $R_t$ is the gas constant at time (t), $T_t$ is the upstream temperature at time (t), V is the internal volume of the flow passage between the control valve 6 and the restriction part 2, and $t_n$ is the time elapsed from the start of measurement.

$$C = \sqrt{k\left(\frac{2}{k+1}\right)^{\frac{k+1}{k-1}}} \qquad (2)$$

In Equation (2), k is the specific-heat ratio of the gas.

$$z(t) = \frac{C_0 \sqrt{R_0 \cdot T_0}}{C_t \sqrt{R_t \cdot T_t}} \times \ln \frac{P_t}{P_0} = \frac{C_0 \sqrt{R_0 \cdot T_0}}{C_t \sqrt{R_t \cdot T_t}} \cdot \left(-\frac{SC_t \sqrt{R_t \cdot T_t}}{V} t_n\right) \qquad (3)$$

Figure 7:
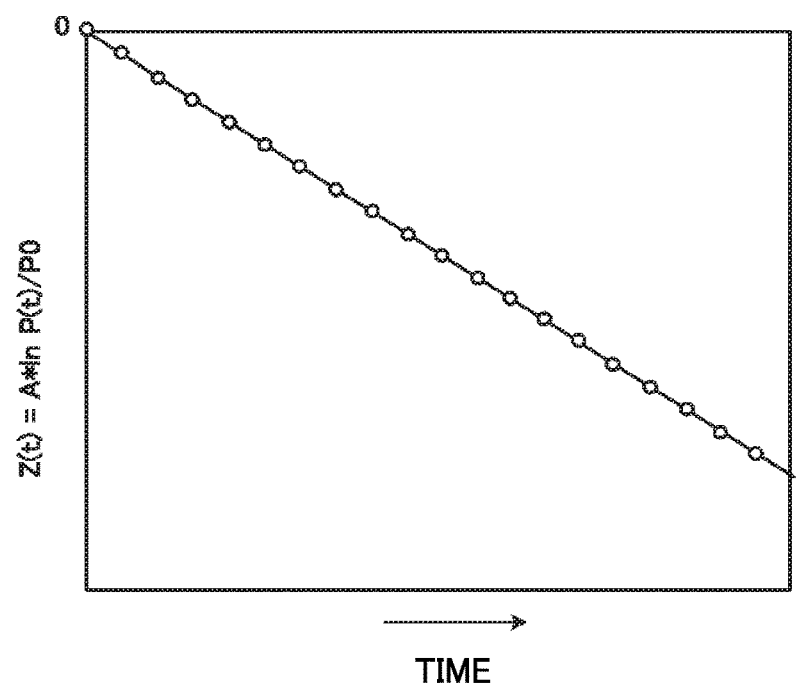
FIG. 7 is a graph logarithmically showing the reference pressure drop data with respect to a function Z(t).

Equation (3) is a function that logarithmically expresses the degree of drop in the upstream pressure $P_t$. In Equation (3), $C_0$, $R_0$, and $T_0$ are respectively the specific-heat ratio of the gas, the gas constant, and the upstream temperature when the control valve 6 is closed, and $C_t$, $R_t$, and $T_t$ are respectively the specific-heat ratio of the gas, the gas constant, and the upstream temperature after the elapse of time (t) from the start of measurement. FIG. 7 is a logarithmic graph showing Z(t).

Figure 8:
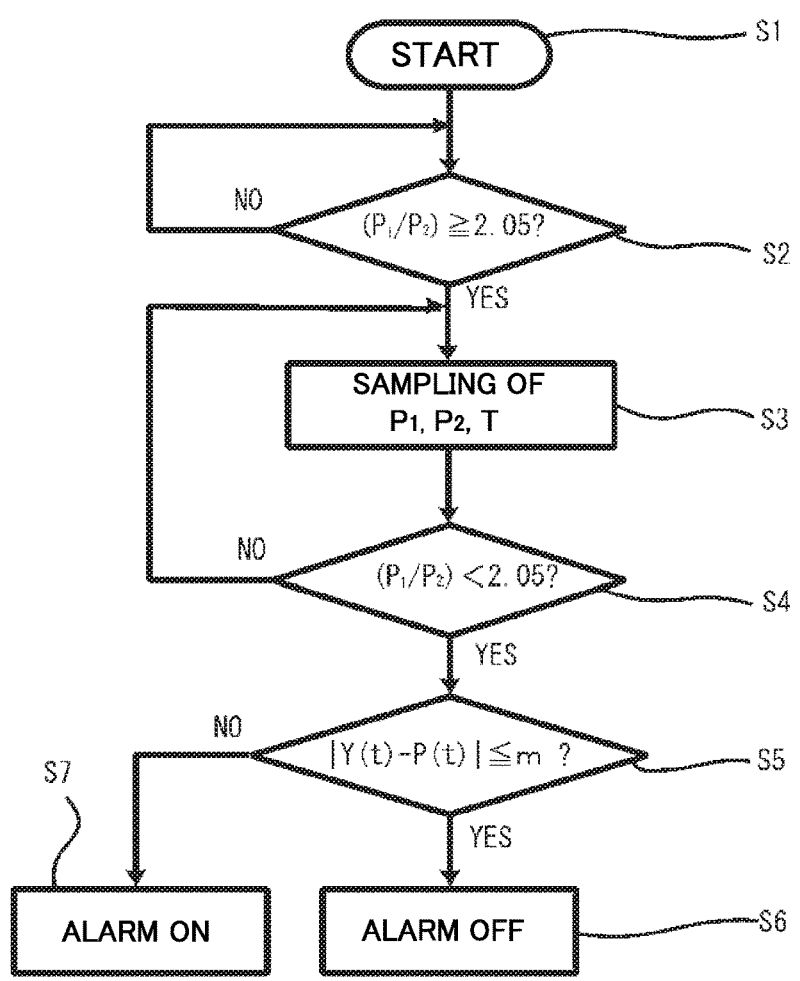
FIG. 8 is a flowchart of flow rate self-diagnosis according to one embodiment of present invention.

Referring to the flowchart in FIG. 8, flow rate self-diagnosis is started when, with the gas flowing at a set flow rate (e.g., 60 percent flow rate), the controller 7 has received a command to stop the supply of gas, and then the controller 7 has issued a close command (0 percent flow rate command) to the control valve 6 whereas the external controller has issued a close command to the shutoff valve 9 (step S1). The close command issued from the controller 7 to the control valve 6 may, for example, be a command to set the flow rate to zero. In the present embodiment, the above-described delay time td occurs during this process, and therefore the downstream pressure $P_2$ starts to rise after a predetermined period of time has elapsed since the upstream pressure $P_1$ starts to drop.

After the close command has been issued to the control valve 6 and the shutoff valve 9, the upstream pressure sensor 3 and the downstream pressure sensor 4 monitor the upstream pressure $P_1$ and the downstream pressure $P_2$ so as to determine whether the critical expansion condition is satisfied (step S2). Specifically, the upstream pressure sensor 3 and the downstream pressure sensor 4 monitor the pressure ratio ($P_1/P_2$) to determine whether the pressure ratio satisfies ($P_1/P_2$)≥2.05 (in the case of an argon gas).

The pressure ratio that satisfies the critical expansion condition varies according to the type of gas. There is a predefined value for each type of gas, e.g., 2.05 for an argon gas, 1.90 for a hydrogen gas, and 1.89 for a nitrogen gas. The critical expansion condition also varies according to the upstream gas temperature. Thus, the controller 7 may be configured to determine the critical expansion condition (conditional expression in step S2 and in step S4 described later) for self-diagnosis on the basis of at least one of the type of gas and the upstream gas temperature.

If the critical expansion condition is satisfied, the pressure drop data P(t) is sampled (step S3). At this time, the upstream pressure $P_1$, the downstream pressure $P_2$, and the temperature T are sampled via the A/D converters from the outputs of the upstream pressure sensor 3, the downstream pressure sensor 4, and the temperature sensor 5 at a predetermined sampling frequency f stored in the memory M.

The pressure drop data P(t) on the upstream pressure $P_1$ is obtained by the sampling at the frequency f, and whether the obtained pressure drop data P(t) satisfies the critical expansion condition is determined on the basis of the upstream pressure $P_1$ and the downstream pressure $P_2$ at each sampling point (step S4). Then, if the critical expansion condition is satisfied (No in step S4), the procedure returns to step S3 and the sampling is continued.

If the critical expansion condition is not satisfied (YES in step S4), the pressure drop data P(t) that has been previously measured under the critical expansion condition and the reference pressure drop data Y(t) are compared to determine whether a difference between these pieces of data is within a predetermined range (S5). In the case of comparing the pressure drop data P(t) with the reference pressure drop data Y(t), the same pressure range is used for comparison. This is because, if the pressure range that is used for comparison is not the same, accurate comparison data cannot be obtained. The comparison may be performed by replacing P(t) and Y(t) in the form of Z(t).

The comparison between the pressure drop data P(t) and the reference pressure drop data Y(t) in step S5 can be performed in various modes. For example, a difference Δε(t) between data Y'(t)=lnPr(t)/Pr0 (where Pr(t) and Pr0 are reference data stored in advance in the memory M) obtained by taking a logarithm of the reference pressure drop data Y divided by the initial pressure, as indicated above by Z(t), and data P'(t)=lnP(t)/P0 obtained by taking a logarithm of the pressure drop data P(t) acquired by sampling and divided by the initial pressure may be obtained at each sampling point, and if a result ΣΔε(t) obtained by accumulating these differences exceeds a predetermined reference value (threshold value), it may be determined to be abnormal conditions.

In the above-described comparison step, the number of samples of the pressure drop data P(t) obtained during the period of time in which the critical expansion condition is satisfied may vary due to the aforementioned difference in the critical expansion period Δt. For example, in the case where, as initial settings, the presence or absence of an abnormality is determined by comparing the accumulated difference obtained from 50 samples (Δε(t1)+Δε(t2), + . . . +Δε(t50)) with the threshold value, only 40 actual samples that satisfy the critical expansion condition may be obtainable. At this time, in the present embodiment, the threshold value itself is changed according to the number of samples n, and the accumulated difference obtained from 40 samples (Δε(t1)+Δε(t2), + . . . +Δε(t40)) is compared with the corresponding threshold value to determine whether an abnormality has occurred. The threshold value used for the comparison may be defined by an equation expressed using the number of samples n. If the threshold value is defined as a function of the number of samples n, the comparison can be performed appropriately irrespective of how the number of actual samples n that satisfy the critical expansion condition fluctuates. Accordingly, the presence or absence of an abnormality can be determined with high accuracy by using all samples acquired within a period of time in which the critical expansion condition is satisfied.

Also, in the mode in which a comparison pattern (here, threshold value) is changed according to the number of samples n, the threshold value may be determined using a pressure value Zn of the last sample obtained within the critical expansion period. In the case where 50 samples are obtained in the above-described example, the pressure value Zn of the last sample is P(t50), and in the case where 40 samples are obtained, the pressure value Zn of the last sample is P(t40). For example, the above-described threshold value may be expressed by a general formula (n+1)×(A·lnZn+B), where A and B are predetermined constants. Moreover, it is also possible to obtain the rate of change x in the cross-sectional area of the restriction part from the above-described deviation amount ΣΔε(t), in addition to determining whether an abnormality has occurred by comparison with the threshold value.

Also, if it turns out in the above-described step that the number of samples n that can be obtained within the critical expansion period is less than a predetermined number (e.g., 50), the sampling frequency f may be updated so as to enable a predetermined number of samples to be obtained. Accordingly, the sampling frequency suitable for the fluid supply system can be determined, and it becomes possible to diagnose flow rate control with high accuracy while securing a sufficient number of samples.

Moreover, the comparison between the pressure drop data and the reference pressure drop data can also be performed by comparing a coefficient of a predetermined relational expression that is obtained from a plurality of pieces of pressure drop data and a coefficient of a predetermined relational expression that is obtained and set in advance from the reference pressure drop data. For example, the presence or absence of an abnormality can be determined depending on whether the slope of an approximate straight line obtained from the above given equation $Z(t)=P'(t)=\ln P(t)/P0$ is within a predetermined range (within a reference slope range).

As expressed by Equation (1) above, the value $\ln(P(t)/P0)$ obtained by taking a logarithm of the pressure drop data divided by the initial pressure can be expressed by $\ln(P(t)/P0)=SC(RT)^{1/2}/V \cdot t$, where S is the cross-sectional area of the aperture, C is the term representing the gas constant, R is the gas constant, T is the upstream gas temperature, and V is the volume of the passage between the control valve and the restriction part. Assuming that C, R, T, and V are constants that do not depend on time, $\ln(P(t)/P0)$ can be defined as a linear function with respect to time t since $\ln(P(t)/P0)$ is expressed as $-\alpha t$, where $\alpha$ is a constant.

Accordingly, it is possible to compare the slope $\alpha$ of the approximate straight line determined on the basis of $\ln(P(t)/P0)$ obtained by measurement (e.g., approximate straight line obtained by the least-squares method using all or some pieces of sample data that is determined to satisfy the critical expansion condition) with a reference slope $\alpha_0$ that is stored in advance as the reference pressure drop data in the memory M and to determine the presence or absence of an abnormality on the basis of the comparison result. Of course, whether an abnormality has occurred may be determined depending on whether the slope $\alpha$ derived from the measured pressure drop data is included within a tolerable range of reference slope ($\alpha_{0L}$ to $\alpha_{0H}$).

As can be seen from Equation (1), since the above-described slope $\alpha$ is a coefficient corresponding to the cross-sectional area S of the aperture of the restriction part, it is appropriate to use the slope $\alpha$ to determine the presence or absence of an abnormality in the cross-sectional area S of the aperture of the restriction part. Also, if the slope $\alpha$ is corrected on the basis of the temperature T, a change in the cross-sectional area S of the aperture of the restriction part can be estimated more accurately.

Figure 14:
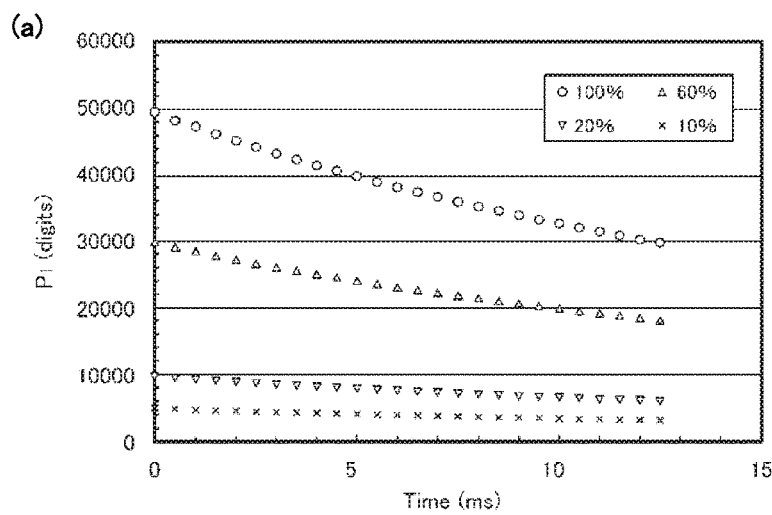
FIGS. 14(a) and 14(b) respectively illustrate pressure drop curves and slopes of $\ln(P/P_0)$ after the control valve is closed for different set flow rates (initial upstream pressures).
Figure 14:
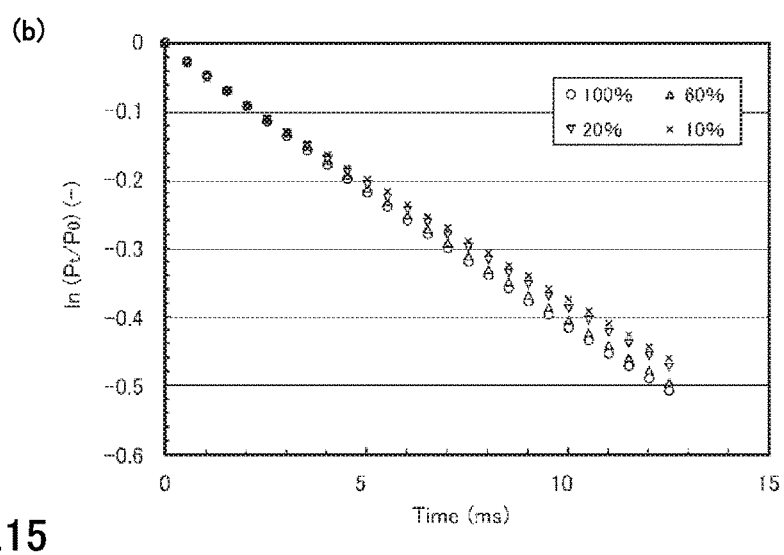

Here, the relationship between the above-described slope $\alpha$ and the set flow rate at the start of self-diagnosis (flow rate at the end of the semiconductor process) will be described. FIGS. 14(*a*) and 14(*b*) are graphs showing pressure drop characteristics for various initial set flow rates, FIG. 14(*a*) showing a pressure drop characteristic when the horizontal axis indicates time t and the vertical axis indicates the upstream pressure $P_1$, and FIG. 14(*b*) showing a pressure drop characteristic when the horizontal axis indicates time t and the vertical axis indicates $\ln(P/P_0)$. In FIGS. 14(*a*) and 14(*b*), open circles indicate data for a 100 percent flow rate, open triangles indicate data for a 60 percent flow rate, open inverted triangles indicate data for a 20 percent flow rate, and crosses indicate data for a 10 percent flow rate.

As shown in FIG. 14(*a*), the pressure drop characteristic of the upstream pressure $P_1$ varies according to the magnitude of the set flow rate. Thus, either preparing reference data in advance for each set flow rate or correcting pressure drop data or reference data on the basis of the set flow rate before comparison, as will be described later, is partially essential.

However, although the slopes $\alpha_x$ of the linear graphs indicating $\ln(P/P_0)$ with respect to time t differ to some degree depending on the magnitude of the x percent set flow rate, they have approximately the same inclination as can be seen from FIG. 14(*b*). Thus, it is possible to store a common reference slope co and a common slope range $\alpha_{0L}$ to $\alpha_{0H}$ for all set flow rates in the memory, instead of setting a reference slope (e.g., $\alpha_{100}$, $\alpha_{60}$, $\alpha_{20}$, or $\alpha_{10}$) for each set flow rate, and to use these common reference slope and common slope range to carry out flow rate self-diagnosis of an arbitrary set flow rate. However, as can be seen from FIG. 14(*b*), there is somewhat of a difference in slope depending on the set flow rate, and therefore it goes without saying that flow rate self-diagnosis may be carried out by comparing a measured slope $\alpha$ with a slope $\alpha_x$ that is set separately for each set flow rate or a corrected reference slope $\alpha_x$ that is defined as a function of the set flow rate.

Moreover, the diagnosis can also be carried out by assuming, for example as exponential attenuation, a curve indicated by the value $(P(t)/P_0)$ obtained by dividing the upstream pressure $P(t)$ in FIG. 14(*a*) by the initial pressure $P_0$, instead of the above-described linear slope $\alpha$, obtaining a proportionality constant by curve fitting or other techniques, and comparing this proportionality constant with reference data (proportionality constant) stored in advance.

After the comparison has been performed as described above, if the difference between the pressure drop data $P(t)$ and the reference pressure drop data $Y(t)$ (in the present example, the accumulated difference $\Sigma\Delta\epsilon$ or the difference between the slope $\alpha_x$ and the reference slope $\alpha_0$) is within a predetermined range, it is determined that there is no abnormality in the restriction part 2, and an alarm 12 is turned off (S6). Note that the above-described constants such as the reference slope $\alpha_0$ are also values that represent the pressure drop characteristic obtained directly from the reference pressure drop data, and therefore in the specification of the present application, flow rate diagnosis using these constants is also assumed to be flow rate diagnosis that is carried out by comparison between the pressure drop data $P(t)$ and the reference pressure drop data $Y(t)$.

On the other hand, if the difference between the pressure drop data $P(t)$ and the reference pressure drop data $Y(t)$ is outside the predetermined range (or greater than or equal to a threshold value), it is determined that there is an abnormality in the restriction part 2, and the alarm 12 is turned on to notify the abnormality (S7).

Figure 9:
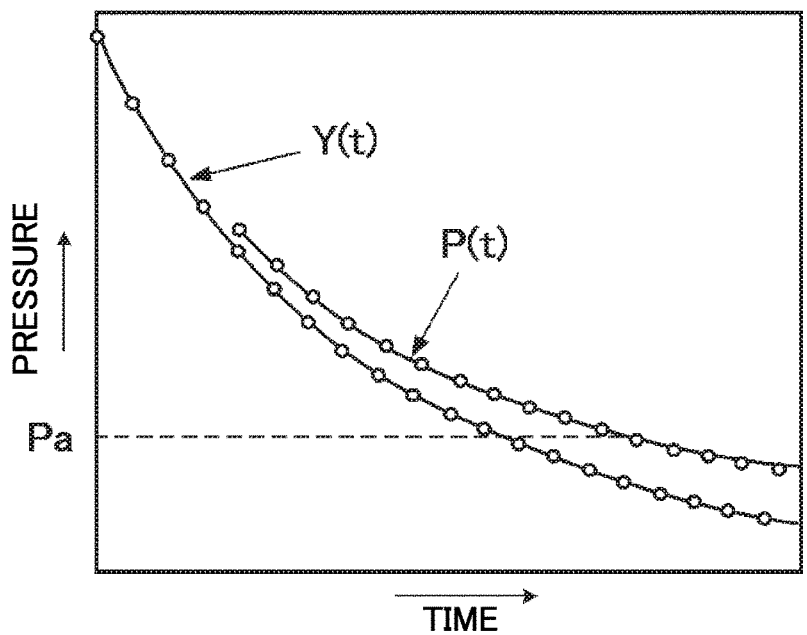
FIG. 9 is a graph showing pressure drop data P(t) and the reference pressure drop data during flow rate self-diagnosis.

FIG. 9 illustrates the pressure drop data $P(t)$ obtained as described above. FIG. 9 illustrates an example in which clogging occurs in the restriction part 2. As can be seen from FIG. 9, since the set flow rate at the start of the flow rate self-diagnosis is 60%, the sampling of the pressure drop data $P(t)$ is started from when the pressure detected by the upstream pressure sensor 3 at the start of flow rate self-diagnosis takes a pressure value lower than that at the start of measurement of the reference pressure drop data $Y(t)$. Then, the pressure drop data $P(t)$ that satisfies the critical expansion condition is sampled until immediately before the transition from the critical expansion condition to the non-critical expansion condition. In this way, the pressure drop data $P(t)$ that satisfies the critical expansion condition can be fully sampled, and accordingly, the amount of sampling time for the pressure drop data $P(t)$ can be increased as compared to the conventional flow rate self-diagnosis. In conventional cases, the sampling is stopped at, for example, a pressure Pa in FIG. 9.

In particular, in the case where flow rate self-diagnosis is carried out using the slope $\alpha$ of the straight line defined by $\ln(p(t)/p_0)$ as the pressure drop data as described above, the diagnosis can be carried out even if the pressure range of the measured pressure drop data does not necessarily match the pressure range of the reference pressure drop data. This makes it easy to secure the maximum possible amount of time for diagnosis by using all or some pieces of sampling data that are determined to reliably satisfy the critical expansion condition for an arbitrary set flow rate.

In the mode in which the deviation amount ΣΔε(t) obtained by accumulation is compared with the threshold value as described above, in the case where the set flow rate during diagnosis is a 60 percent flow rate as illustrated in FIG. 9, it is difficult to carry out diagnosis with the same time base as that of the reference pressure drop data measured at a 100 percent flow rate. Thus, the comparison may be made with data on the pressure corresponding to a 60 percent flow rate (e.g., Y(t20)) and subsequent data among the reference pressure drop data (i.e., Y(t20) and P(t0) are compared). Also, in order to improve diagnostic accuracy, diagnosis may be started from comparison between Y(t25) and P(t5) while excluding initial measured data (e.g., P(t0) to P(t5)). This also applies to the case where diagnosis is carried out by comparison between ln(p(t)/p$_0$) and the corresponding reference pressure drop data.

Figure 10:
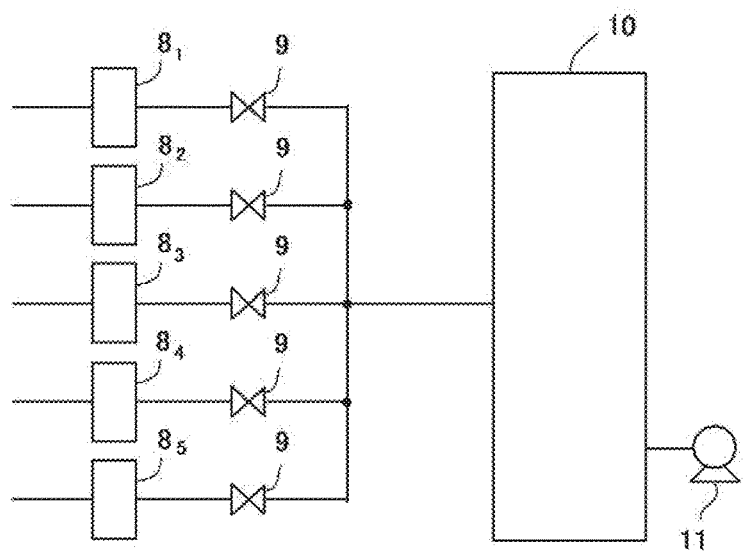
FIG. 10 is a block diagram showing an example in which a plurality of pressure-type flow rate control devices are connected in parallel.

In semiconductor manufacturing equipment, often a plurality of pressure-type flow rate control devices $8_1$ to $8_5$ are connected in parallel as, for example, illustrated in FIG. 10, and different types of gases are supplied at a predetermined flow rate from the respective pressure-type flow rate control devices $8_1$ to $8_5$ to the process chamber 10. The process chamber 10 is evacuated by the vacuum pump 11. In semiconductor manufacturing processes, for example in some cases, different types of gases may be supplied simultaneously from the respective pressure-type flow rate control devices $8_1$ to $8_5$ to the process chamber 10. In such processes, there are, for example, cases in which the supply of gas from one pressure-type flow rate control device $8_1$ is stopped, and the supply of gases from the other pressure-type flow rate control devices $8_2$ to $8_5$ is continued. While the other pressure-type flow rate control devices $8_2$ to $8_5$ continue the supply of gases, the downstream pressure of the one pressure-type flow rate control device $8_1$ that has stopped the supply of gas becomes higher than a vacuum pressure. Even in such a case, if the critical expansion condition is being monitored, it is possible to carry out flow rate self-diagnosis by sampling the pressure drop data P(t) at the time when the supply of gas from only the pressure-type flow rate control device $8_1$ is stopped. This eliminates the need for the maintenance mode in which the supply of gases from all of the pressure-type flow rate control devices $8_1$ to $8_5$ is stopped for flow rate self-diagnosis.

Next, other embodiments of the self-diagnostic function will be described with appropriate reference to the flowchart in FIG. 11. Here, description is given regarding an example in which pressure-type flow rate control devices are connected in parallel as illustrated in FIG. 10.

In the example in FIG. 10, before the start of flow rate self-diagnosis, the pressure-type flow rate control devices $8_1$ to $8_5$ each supply gas at a 60 percent set flow rate. Then, a gas stop command is input to the pressure-type flow rate control device $8_1$ while the pressure-type flow rate control devices $8_2$ to $8_5$ are controlled to supply gas at the set flow rate.

Figure 11:
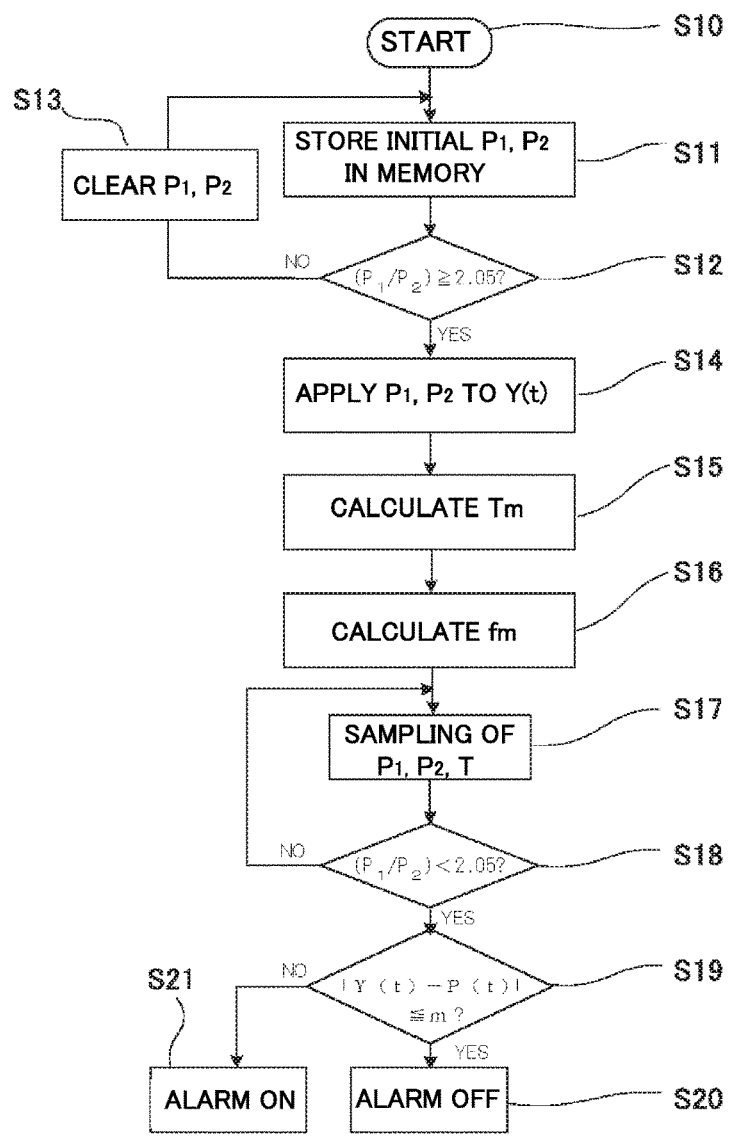
FIG. 11 is a flowchart of flow rate self-diagnosis according to another embodiment of the present invention.

As illustrated in FIG. 11, flow rate self-diagnosis is started upon input of the gas stop command to the pressure-type flow rate control device $8_1$ (step S10). The control valve 6 is closed upon input of the gas stop command.

The upstream pressure $P_1$ and the downstream pressure $P_2$ at the start of the flow rate self-diagnosis from the upstream pressure sensor 3 and the downstream pressure sensor 4 are stored in the memory M (step S11).

When the flow rate self-diagnosis is started, whether the critical expansion condition is satisfied is determined by monitoring the upstream pressure $P_1$ and the downstream pressure $P_2$ detected by the upstream pressure sensor 3 and the downstream pressure sensor 4 (S12). Specifically, the pressure ratio ($P_1/P_2$) is monitored to determine whether the pressure ratio satisfies ($P_1/P_2$)≥2.05 (in the case of an argon gas).

If the critical expansion condition is not satisfied, the upstream pressure $P_1$ and the downstream pressure $P_2$ stored in the memory M are cleared, and the procedure returns to the start (step S13).

If the critical expansion condition is satisfied, the initial upstream pressure $P_1$ and the initial downstream pressure $P_2$ stored in the memory M are applied to the reference pressure drop data Y(t) (step S14).

A critical expansion time Tm from when the control valve 6 is closed to before when the critical expansion condition is not satisfied is calculated on the basis of the reference pressure drop data Y(t) (step S15).

A sampling frequency fm (the number of samples obtained within one second) of the upstream pressure sensor 3 is calculated on the basis of the critical expansion time Tm (step S16). Specifically, the sampling frequency is calculated by dividing the critical expansion time by a predetermined number of samples.

Using the calculated sampling frequency, the sampling of the pressure drop data P(t) is started (step S17).

The upstream pressure $P_1$ and the downstream pressure $P_2$ detected by the upstream pressure sensor 3 and the downstream pressure sensor 4 are monitored to determine whether the critical expansion condition is satisfied (step S18).

If the critical expansion condition is not satisfied, the pressure drop data P(t) that has been obtained while the critical expansion condition is satisfied is compared with the reference pressure drop data Y(t) so as to determine whether the difference between those pieces of data is within a predetermined range (step S19). In the case of comparing the pressure drop data P(t) with the reference pressure drop data Y(t), the same pressure range is used. The comparison may be performed by replacing P(t) and Y(t) in the form of Z(t).

If the difference between the pressure drop data P(t) and the reference pressure drop data Y(t) is within the predetermined range (or greater than or equal to a threshold value), it is determined that there is no abnormality in the restriction part 2, and the alarm 12 is turned off (step S20).

On the other hand, if the difference between the pressure drop data P(t) and the reference pressure drop data Y(t) is outside the predetermined range, it is determined that there is an abnormality in the restriction part 2, and the alarm 12 is turned on to notify the abnormality (step S21).

Figure 12:
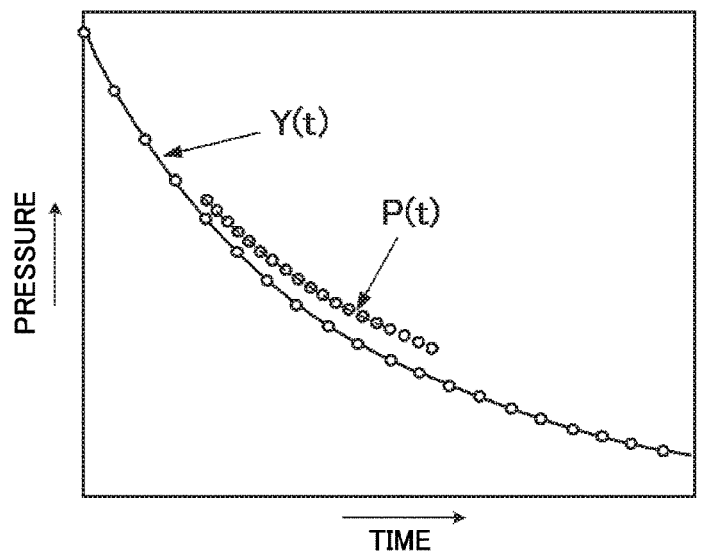
FIG. 12 is a graph showing the pressure drop data P(t) during flow rate self-diagnosis performed in accordance with the flowchart in FIG. 11.
Figure 13:
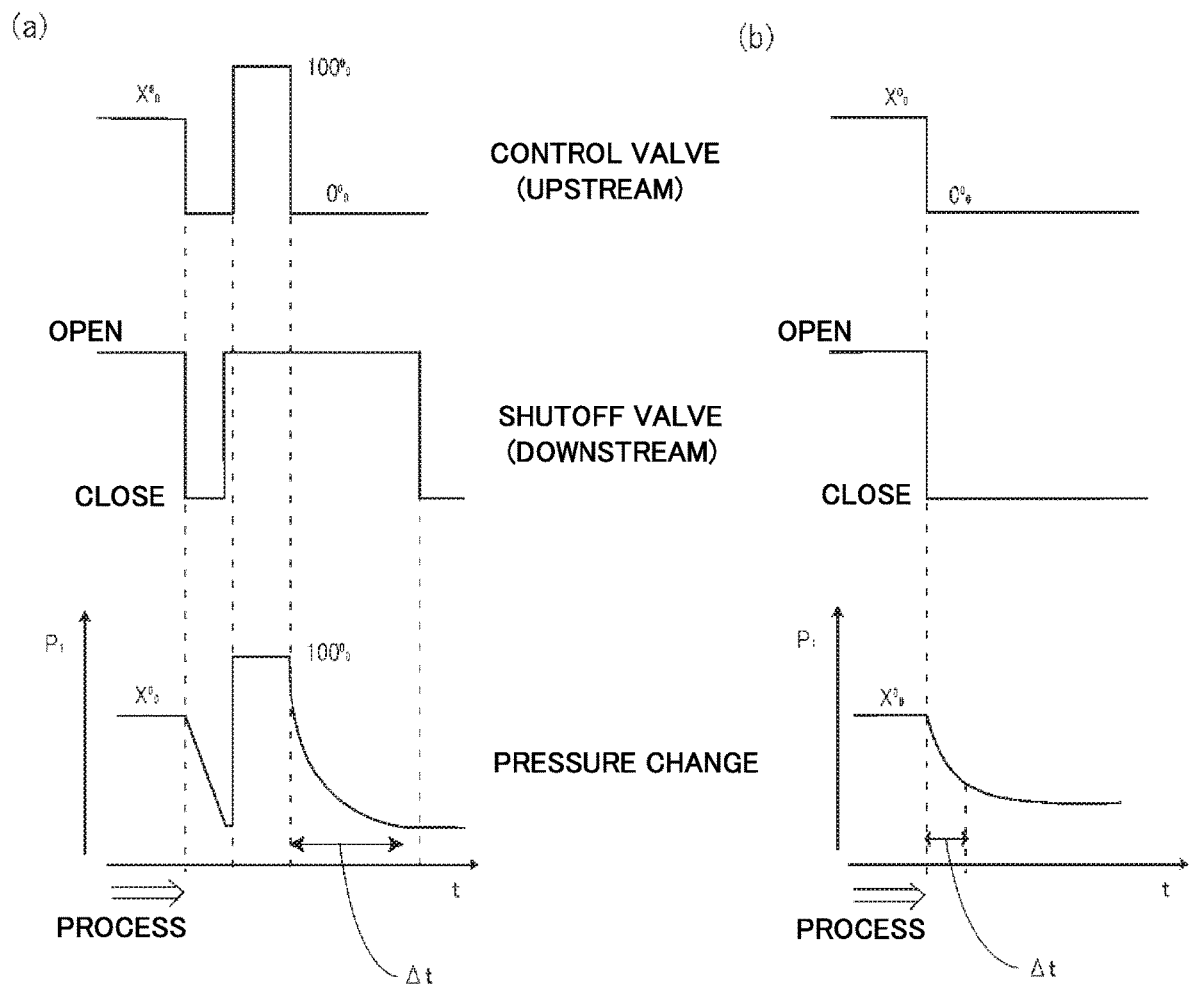
FIGS. 13(a) and 13(b) are diagrams for describing self-diagnostic processes according respectively to a comparative example and a working example, the upper section illustrating a command to open and close the control valve (flow rate control command), the middle section illustrating a command to open and close the shutoff valve, and the lower section illustrating a change in upstream pressure.

By automatically changing the sampling frequency fm in accordance with the upstream pressure and the downstream pressure at the start of the flow rate self-diagnosis as described above, it is possible to secure the required number of data pieces for the pressure drop data P(t) and to appropriately carry out flow rate self-diagnosis, even if there is only a short sampling time for measurement. FIG. 12 is a graph showing the pressure drop data P(t) measured when the sampling frequency fm has been changed, together with the reference pressure drop characteristic y(t).

The present invention is not limited to the embodiments described above and may be modified in various ways within a range that does not deviate from the gist of the present invention. For example, while the pressure drop data is applied to Equation (3) described above in the above-described embodiments, the pressure drop data may be approximated by an exponential function ($Y(t)=P_0 \cdot e^{-kt}$). Also, for example the relationship between the critical expansion time and the sampling frequency may be stored in advance as a function of the sampling frequency with respect to the critical expansion time in the memory.

Also, in order to keep a high detection accuracy of the upstream pressure sensor and the downstream pressure sensor, for example, in the case where a phenomenon has been observed in which the upstream pressure and the downstream pressure have different convergence pressures P, the upstream pressure sensor and the downstream pressure sensor may be calibrated on the basis of this error.

Other Embodiments

Hereinafter, other embodiments of self-diagnosis conducted after process termination will be described.

In embodiments described below, self-diagnosis is also carried out using the reference pressure drop data Y(t) and the measured pressure drop data P(t), and as illustrated in FIG. 14(b), self-diagnosis is carried out by comparing the slope $\alpha$ of the straight line expressed by $\ln(P(t)/P_0)=-\alpha t$ with the reference slope $\alpha_0$. Note that in the present embodiment, self-diagnosis is carried out using the reference pressure drop data (reference slope $\alpha_0$) associated with the initial upstream pressure (or initial flow rate) as described above.

The initial upstream pressure or the initial flow rate as used herein refers to the upstream pressure or the flow rate measured for self-diagnosis when the control valve 6 is closed, and refers to the upstream pressure or the flow rate measured when the acquisition of the pressure drop data P(t) is started. That is, they correspond to an x percent set flow rate that is the flow rate at the end of a process or at the start of self-diagnosis illustrated in FIG. 13(b).

Figure 15:
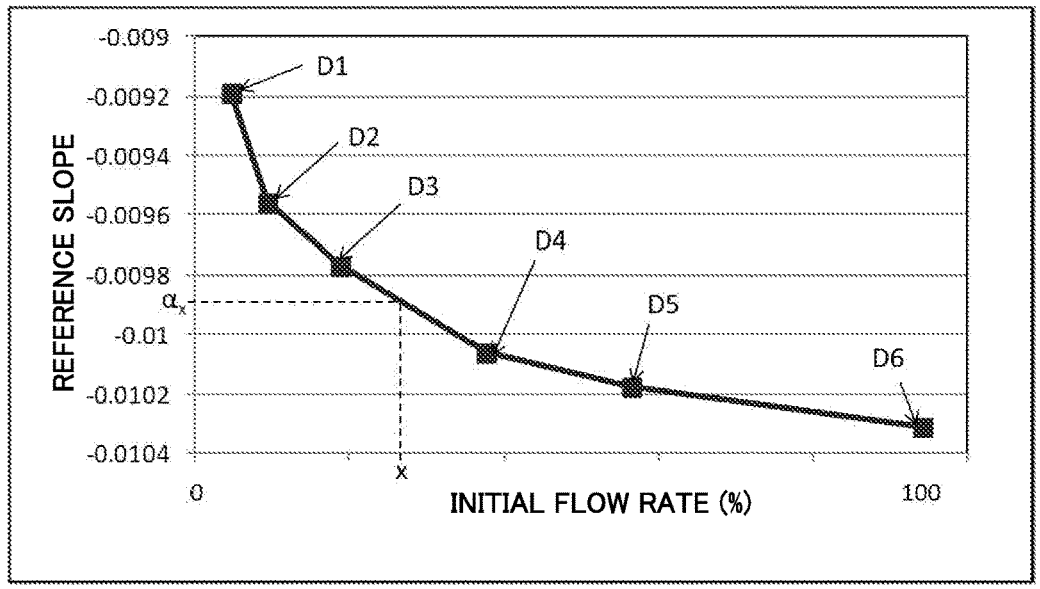
FIG. 15 is a graph showing the relationship between the initial flow rate (corresponding to the initial upstream pressure) and a reference slope according to an embodiment of the present invention.

FIG. 15 is a graph showing a reference slope that is set in association with the initial upstream pressure (here, indicated as the initial flow rate). As can be seen from the graph, in the present embodiment, the reference slope takes various values depending on the initial flow rate and is not constant. This is because the slope of $\ln(P(t)/P_0)$ is found to vary with the initial flow rate (set flow rate at the end of a process) as illustrated in FIG. 14(b). Thus, in the case where the initial flow rate can take various values, such as at the end of a process, using the corresponding reference slope can help increasing the accuracy of self-diagnosis.

Also, as can be seen by reference to FIG. 15, the relationship between the initial flow rate and the reference slope may be such that data on a plurality of discrete fixed points D1 to D6 (combinations of the initial flow rate and the reference slope) is stored as a correction table in the memory of the controller 7, and in the case where the initial flow rate is within the range of the fixed points D1 to D6, the reference slope may be obtained by calculation using the correction table as a reference. Specifically, for example in the case where the initial flow rate is an x percent flow rate between the two fixed points D3 and D4, an equation of the straight line connecting these two fixed points D3 and D4 is referenced so that the reference slope $\alpha_x$ can be obtained by calculation from the x percent initial flow rate as illustrated in FIG. 15.

In this way, if the controller 7 includes the reference slope as a function of the x percent initial flow rate or the initial pressure $P_0$, an appropriate reference slope can be used for an arbitrary x percent initial flow rate or the initial pressure $P_0$, and the accuracy of self-diagnosis can be further increased.

Also, the reference slope and the slope measured at the time of self-diagnosis described above can also be obtained by using only part of the pressure drop data (e.g., a period in which the flow rate drops from a 100 percent flow rate to a 70 percent flow rate). In this way, if the slope of $\ln(P(t)/P_0)$ is obtained by selectively using data in the initial stage, the number of samples can be reduced, and accordingly speeding up of data sampling can be achieved. This allows self-diagnosis to be carried out in a short amount of time, such as during a period between a plurality of steps that constitute one semiconductor manufacturing process, thus making it possible to more frequently detect an abnormality.

Also, in the present embodiment, self-diagnosis can be carried out using data measured in a relatively early stage of upstream pressure drop, and thus it is easy to use data that satisfies the critical expansion condition (a relatively high upstream pressure). Accordingly, in the present embodiment, there is no need to always determine whether the critical expansion condition is satisfied, in the case of measuring a pressure drop, and the flow rate control device does not necessarily have to include a downstream pressure sensor.

However, it is also preferable in the present embodiment to provide a pressure sensor on the downstream side and to determine whether the critical expansion condition is satisfied by referencing the upstream pressure and the downstream pressure at the time when the last pressure drop data is acquired. If it has been determined that the critical expansion condition is not satisfied at the time when the last data is acquired, the user may be notified of this fact by, for example, display of a warning.

While, in the aforementioned embodiments, the shutoff valve 9 disposed downstream of the restriction part 2 is closed during self-diagnosis, the embodiments of the present invention are not limited to this, and the shutoff valve 9 may be kept open. Irrespective of whether the shutoff valve 9 is closed or open, better self-diagnosis can be carried out. However, from the viewpoint of preventing unnecessary gas from flowing to the process chamber at the end of a process, it is also preferable in the embodiments of the present invention to close the shutoff valve 9 during self-diagnosis.

REFERENCE SIGNS LIST

1 Flow passage
2 Restriction part
3 Upstream pressure sensor
4 Downstream pressure sensor
5 Temperature sensor
6 Control valve
7 Controller
8 Pressure-type flow rate control device
9 Shutoff valve
10 Process chamber
11 Vacuum pump
12 Alarm

The invention claimed is:

1. A pressure-type flow rate control device comprising:
a restriction part;
a control valve provided upstream of the restriction part;
an upstream pressure sensor that detects a pressure of a flow passage between the restriction part and the control valve;
a downstream pressure sensor that detects a pressure of a flow passage downstream of the restriction part; and
a controller having a flow rate self-diagnostic function of diagnosing flow rate control using pressure drop data on the flow passage between the control valve and the restriction part and reference pressure drop data,
wherein a shutoff valve is provided downstream of the downstream pressure sensor, wherein in a case of executing the flow rate self-diagnostic function, a close command is issued to the control valve and the shutoff valve, and the controller closes the control valve, determines whether a predetermined critical expansion condition is satisfied by using outputs of the upstream pressure sensor and the downstream pressure sensor that are measured after the control valve is closed, and diagnoses flow rate control by using the pressure drop data acquired during a period in which the predetermined critical expansion condition is satisfied, and wherein in a case where the close command is issued, the shutoff valve is closed after a predetermined amount of time has elapsed from when the control valve is closed, and the pressure drop data acquired during the period in which the predetermined critical expansion condition is satisfied includes pressure drop data that is acquired from when the close command is issued to the shutoff valve to before when the shutoff valve is closed, and pressure drop data that is acquired after the shutoff valve is closed and a downstream pressure has risen.

2. The pressure-type flow rate control device according to claim 1, wherein the control valve is a piezoelectric element-driven control valve, the shutoff valve is a fluid operated valve, and the close command is issued simultaneously to the control valve and the shutoff valve.

3. The pressure-type flow rate control device according to claim 1, wherein the pressure drop data is acquired by sampling the output from the upstream pressure sensor at a preset sampling frequency, and the flow rate control is diagnosed based on comparison between a coefficient of a predetermined function acquired from a plurality of pieces of the pressure drop data and a reference coefficient stored in advance as the reference pressure drop data.

4. The pressure-type flow rate control device according to claim 1, wherein the pressure drop data is acquired by sampling the output from the upstream pressure sensor at a preset sampling frequency, and a form of comparison with the reference pressure drop data is determined based on the number of samples obtained during the period in which the predetermined critical expansion condition is satisfied.

5. The pressure-type flow rate control device according to claim 1, wherein the pressure drop data is acquired by sampling the output from the upstream pressure sensor at a preset sampling frequency, and the preset sampling frequency is updated based on the number of samples obtained during the period in which the predetermined critical expansion condition is satisfied.

6. The pressure-type flow rate control device according to claim 1, further comprising:

a temperature sensor that detects a temperature between the restriction part and the control valve, wherein the controller controls the control valve on a basis of the outputs from the upstream pressure sensor, the downstream pressure sensor, and the temperature sensor to set a flow rate passing through the restriction part to a set flow rate.

7. The pressure-type flow rate control device according to claim 6, wherein the predetermined critical expansion condition is determined based on at least one of a type of gas that flows through the restriction part and the temperature that is output from the temperature sensor.

8. The pressure-type flow rate control device according to claim 1, wherein the controller performs the comparison with the reference pressure drop data after correcting the pressure drop data on a basis of a flow rate or an upstream pressure at a time when the control valve is closed.

9. A flow rate self-diagnosis method performed in a pressure-type flow rate control device that includes a restriction part, a control valve provided upstream of the restriction part, an upstream pressure sensor that detects a pressure of a flow passage between the restriction part and the control valve, a downstream pressure sensor that detects a pressure of a flow passage downstream of the restriction part, with a shutoff valve being provided downstream of the downstream pressure sensor, and a controller having a flow rate self-diagnostic function of diagnosing flow control by using pressure drop data on the flow passage between the control valve and the restriction part and reference pressure drop data stored in advance, the flow rate self-diagnosis method comprising the steps of:

issuing a close command to the control valve and the shutoff valve during a period in which a gas flows at a controlled set flow rate;

after the close command is issued, determining whether a critical expansion condition is satisfied based on outputs of the upstream pressure sensor and the downstream pressure sensor;

if the critical expansion condition is satisfied, storing pressure drop data measured during a period in which the critical expansion condition is satisfied; and carrying out self-diagnosis of flow rate control by comparing pressure drop data acquired during the period in which the critical expansion condition is satisfied with the reference pressure drop data, wherein when the close command is issued, the shutoff valve is closed after a predetermined period of time has elapsed from when the control valve is closed, and at least one piece of pressure drop data acquired from when the close command is issued to before when the shutoff valve is closed and at least one piece of pressure drop data acquired after the shutoff valve is closed are used as pressure drop data acquired during the period in which the critical expansion condition is satisfied.

10. The flow rate self-diagnosis method according to claim 9, wherein the step of issuing the close command is executed when gas supply is stopped at the end of a process of semiconductor manufacturing equipment connected to the pressure-type flow rate control device.

11. The flow rate self-diagnosis method according to claim 9, wherein the step of carrying out self-diagnosis of flow rate control includes a step of comparing a coefficient of a predetermined function obtained from the pressure drop data and a reference coefficient stored in advance as the reference pressure drop data.

12. The flow rate self-diagnosis method according to claim 9, further comprising the step of:

determining the critical expansion condition on a basis of at least one of a type of gas flowing through the restriction part and a temperature of the gas.

13. A pressure-type flow rate control device comprising:
a restriction part;
a control valve provided upstream of the restriction part;
an upstream pressure sensor that detects a pressure of a flow passage between the restriction part and the control valve;
a downstream pressure sensor that detects a pressure of a flow passage downstream of the restriction part; and
a controller having a flow rate self-diagnostic function of diagnosing flow rate control by using pressure drop data on the flow passage between the control valve and the restriction part and reference pressure drop data,
wherein a shutoff valve is provided downstream of the downstream pressure sensor,
wherein, in a case where the flow rate self-diagnostic function is executed, the controller acquires the pressure drop data by measuring a drop in upstream pressure with the upstream pressure sensor after the control valve is closed, and uses, as the reference pressure drop data, reference pressure drop data that is based on either an initial upstream pressure that is an upstream pressure at a time when the control valve is closed or an initial flow rate that is a flow rate determined by the initial upstream pressure,
wherein in executing the flow rate self-diagnostic function, a close command is issued to the control valve and the shutoff valve, and the controller determines whether a predetermined critical expansion condition is satisfied by using outputs of the upstream pressure sensor and the downstream pressure sensor, and diagnoses flow rate control by using the pressure drop data acquired during a period in which the predetermined critical expansion condition is satisfied, and
wherein in a case where the close command is issued, the shutoff valve is closed after a predetermined amount of time has elapsed from when the control valve is closed, and
the pressure drop data acquired during the period in which the predetermined critical expansion condition is satisfied includes pressure drop data that is acquired from when the close command is issued to the shutoff valve to before when the shutoff valve is closed, and pressure drop data that is acquired after the shutoff valve is closed and a downstream pressure has risen.

14. The pressure-type flow rate control device according to claim 13, wherein
the reference pressure drop data is a slope $\alpha$ of a straight line defined by $\ln(P(t)/P_0)=-\alpha t$, where $P(t)$ is a function of pressure with respect to time, $P_0$ is an initial pressure, and $t$ is time.

15. The pressure-type flow rate control device according to claim 14, wherein
the controller has the slope $\alpha$ of the straight line defined by $\ln(P(t)/P_0)=-\alpha t$ as a function of the initial pressure $P_0$.

16. The pressure-type flow rate control device according to claim 13, wherein
whether the predetermined critical expansion condition is satisfied is determined after the pressure drop data has been acquired.

17. A flow rate self-diagnosis method performed in a pressure-type flow rate control device that includes a restriction part, a control valve provided upstream of the restriction part, an upstream pressure sensor that detects a pressure of a flow passage between the restriction part and the control valve, a downstream pressure sensor that detects a pressure of a flow passage downstream of the restriction part, a shutoff valve being provided downstream of the downstream pressure sensor, and a controller having a flow rate self-diagnostic function of diagnosing flow rate control by using pressure drop data on the flow passage between the control valve and the restriction part and reference pressure drop data,
the flow rate self-diagnosis method comprising the steps of:
issuing a close command to the control valve and the shutoff valve during a period in which a gas flows at a controlled set flow rate;
after the close command is issued, determining whether a critical expansion condition is satisfied based on outputs of the upstream pressure sensor and the downstream pressure sensor;
acquiring the pressure drop data during a period in which the critical expansion condition is satisfied by measuring a drop in upstream pressure with the upstream pressure sensor; and
diagnosing flow rate control by comparing the pressure drop data and the reference pressure drop data,
wherein a slope $\alpha$ of a straight line defined by $\ln(P(t)/P_0)=-\alpha t$, where $P(t)$ is a function of a pressure with respect to time, $P_0$ is an initial pressure, and $t$ is time, is used as the pressure drop data and the reference pressure drop data, and
wherein in a case where the close command is issued, the shutoff valve is closed after a predetermined amount of time has elapsed from when the control valve is closed, and
the pressure drop data acquired during the period in which the predetermined critical expansion condition is satisfied includes pressure drop data that is acquired from when the close command is issued to the shutoff valve to before when the shutoff valve is closed, and pressure drop data that is acquired after the shutoff valve is closed and a downstream pressure has risen.

18. A pressure-type flow rate control device comprising:
a restriction part;
a control valve provided upstream of the restriction part;
an upstream pressure sensor that detects a pressure of a flow passage between the restriction part and the control valve;
a downstream pressure sensor that detects a pressure of a flow passage downstream of the restriction part; and
a controller having a flow rate self-diagnostic function of diagnosing flow rate control using pressure drop data on the flow passage between the control valve and the restriction part and reference pressure drop data,
wherein a shutoff valve is provided downstream of the downstream pressure sensor,
wherein in a case of executing the flow rate self-diagnostic function, a close command is issued to the control valve and the shutoff valve, and the controller closes the control valve, determines whether a predetermined critical expansion condition is satisfied by using outputs of the upstream pressure sensor and the downstream pressure sensor that are measured after the control valve is closed, and diagnoses flow rate control by using the pressure drop data acquired during a period in which the predetermined critical expansion condition is satisfied, wherein the pressure drop data is acquired by sampling the output from the upstream pressure sensor at a preset sampling frequency, and the preset sampling frequency is updated based on the number of samples obtained during the period in which the predetermined critical expansion condition is satisfied.

* * * * *